US012793284B2

(12) United States Patent
Ramasubramonian et al.

(10) Patent No.: US 12,793,284 B2
(45) Date of Patent: Nov. 10, 2026

(54) USING VERTICAL PREDICTION FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 18/354,443

(22) Filed: Jul. 18, 2023

(65) Prior Publication Data

US 2024/0037804 A1 Feb. 1, 2024

Related U.S. Application Data

(60) Provisional application No. 63/368,971, filed on Jul. 20, 2022.

(51) Int. Cl.
*G06T 9/40* (2006.01)
*G06T 17/00* (2006.01)

(52) U.S. Cl.
CPC ................ *G06T 9/40* (2013.01); *G06T 17/00* (2013.01); *G06T 2210/56* (2013.01)

(58) Field of Classification Search
CPC ....... G06T 9/40; G06T 17/00; G06T 2210/56; G06T 9/004; G06T 9/001; H04N 19/597
See application file for complete search history.

(56) References Cited

U.S. PATENT DOCUMENTS

| | | | | |
|---|---|---|---|---|
| 9,098,754 | B1 | 8/2015 | Stout et al. | |
| 11,388,438 | B2 | 7/2022 | He et al. | |
| 11,394,979 | B2 | 7/2022 | Oh et al. | |
| 12,294,740 | B2 * | 5/2025 | Sugio | H04N 19/597 |
| 2021/0312670 | A1 * | 10/2021 | Mammou | G06T 9/40 |
| 2021/0326734 | A1 | 10/2021 | Van Der Auwera et al. | |
| 2022/0207780 | A1 | 6/2022 | Ramasubramonian et al. | |

(Continued)

FOREIGN PATENT DOCUMENTS

WO 2022147100 7/2022

OTHER PUBLICATIONS

International Search Report and Written Opinion—PCT/US2023/070479—ISA/EPO—Oct. 9, 2023.

(Continued)

*Primary Examiner* — Said Broome
*Assistant Examiner* — Jordan Wan Yick
(74) *Attorney, Agent, or Firm* — QUALCOMM Incorporated; Espartaco Diaz Hidalgo

(57) ABSTRACT

A point cloud encoder and decoder are configured to code point cloud data using predictive geometry coding and a vertical predictor. A vertical predictor is a previously coded point in the point cloud having a different laser ID compared to the currently coded point. The point cloud encoder and decoder may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry decoding.

59 Claims, 26 Drawing Sheets

(56) References Cited

U.S. PATENT DOCUMENTS

| | | | |
|---|---|---|---|
| 2023/0105931 | A1 | 4/2023 | Van Der Auwera et al. |
| 2023/0394712 | A1* | 12/2023 | Park ........................ G06T 9/001 |

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Lasserre.S., et al., "M57810 [G-PCC-EE13.53 Related] on Using a Vertical Predictor for Radius Prediction in L3C2", Xiaomi, 2021, 16 Pages.

Roimela K., et al., "Model Scale and Offset Signaling for PCC", International Organisation for Standardisation Organisation Internationale DE Normalisation ISO/IEC JTC1/SC29/WG11 Coding of Moving Pictures and Audio, ISO/IEC JTC1/SC29/WG11 MPEG2018/M42470, Apr. 2018, San Diego, USA, 2 Pages.

* cited by examiner

USING VERTICAL PREDICTION FOR GEOMETRY POINT CLOUD COMPRESSION

This application claims the benefit of U.S. Provisional Patent Application 63/368,971, filed Jul. 20, 2022, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for predictive geometry coding in geometry-based point cloud compressions. In particular, a point cloud encoder and decoder are configured to code point cloud data using predictive geometry coding and a vertical predictor. A vertical predictor is a previously coded point in the point cloud having a different laser ID compared to the currently coded point.

Using such a vertical predictor that has a laser ID different from the point being coded may increase the number of points available for performing predictive geometry coding. In particular, points from different laser IDs may sometimes have coordinate values closer to that of the current point as compared to other coded points having the same laser ID. Accordingly, the predictive geometry coding techniques using vertical predictors of this disclosure may improve coding efficiency. In general, a point cloud encoder and decoder may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry decoding.

In one example, this disclosure describes an apparatus configured to decode point cloud data, the apparatus comprising a memory, and one or more processors coupled to the memory. The one or more processors configured are to cause the apparatus to determine a pivot laser ID, determine a vertical predictor for a current point of the point cloud data, wherein the vertical predictor is based on a second point having a second laser ID different than the pivot laser ID, and decode the current point using the vertical predictor and predictive geometry decoding.

In another example, this disclosure describes an apparatus configured to encode point cloud data, the apparatus comprising a memory, and one or more processors coupled to the memory. The one or more processors are configured to cause the apparatus to determine a pivot laser ID, determine a vertical predictor for a current point of the point cloud data, wherein the vertical predictor is based on a second point having a second laser ID different than the pivot laser ID, encode the current point using the vertical predictor and predictive geometry encoding.

In another example, this disclosure describes a method for decoding point cloud data, the method comprising determining a pivot laser ID, determining a vertical predictor for a current point of the point cloud data, wherein the vertical predictor is based on a second point having a second laser ID different than the pivot laser ID, and decoding the current point using the vertical predictor and predictive geometry decoding.

In another example, this disclosure describes a method for encoding point cloud data, the method comprising determining a pivot laser ID, determining a vertical predictor for a current point of the point cloud data, wherein the vertical predictor is based on a second point having a second laser ID different than the pivot laser ID, and encoding the current point using the vertical predictor and predictive geometry encoding.

In another example, this disclosure describes a non-transitory computer-readable storage medium storing instructions that, when executed, cause one or more processors configured to decode point cloud data to determine a pivot laser ID, determine a vertical predictor for a current point of the point cloud data, wherein the vertical predictor is based on a second point having a second laser ID different than the pivot laser ID, and decode the current point using the vertical predictor and predictive geometry decoding.

In another example, this disclosure describes a non-transitory computer-readable storage medium storing instructions that, when executed, cause one or more processors configured to encode point cloud data to determine a pivot laser ID, determine a vertical predictor for a current point of the point cloud data, wherein the vertical predictor is based on a second point having a second laser ID different than the pivot laser ID, encode the current point using the vertical predictor and predictive geometry encoding.

In another example, this disclosure describes an apparatus configured to decode point cloud data, the apparatus comprising means for determining a pivot laser ID, means for determining a vertical predictor for a current point of the point cloud data, wherein the vertical predictor is based on a second point having a second laser ID different than the pivot laser ID, and means for decoding the current point using the vertical predictor and predictive geometry decoding.

In another example, this disclosure describes an apparatus configured to encode point cloud data, the apparatus comprising means for determining a pivot laser ID, means for determining a vertical predictor for a current point of the point cloud data, wherein the vertical predictor is based on a second point having a second laser ID different than the pivot laser ID, and means for encoding the current point using the vertical predictor and predictive geometry encoding.

The details of one or more examples are set forth in the accompanying drawings and the description below. Other features, objects, and advantages will be apparent from the description, drawings, and claims.

DETAILED DESCRIPTION

In intra prediction for predictive geometry coding, one or more points that are coded are placed in a predictor list. For example, a G-PCC encoder and G-PCC decoder may place one or more points in a predictor list. The prediction of radius and azimuth values (and in some cases laser ID) of the spherical coordinates of a point are performed. Typically, based on the order in which points are coded, the predictor points in the list are points that have the same laser ID as the current coded point.

For spinning LIDAR systems with more than one laser, adjacent lasers are likely to capture points that belong to the same object. For regular objects, it is likely that the distance of the adjacent captured point of the same object is similar. This correlation is currently not used in the prediction mechanism in predictive geometry coding resulting in less coding efficiency. The techniques of this disclosure address this issue.

In particular, a point cloud encoder and decoder are configured to code point cloud data using predictive geometry coding and a vertical predictor. A vertical predictor is based on a previously coded point in the point cloud having a different laser ID compared to the currently coded point.

Using such a vertical predictor that has a laser ID different from the point being coded may increase the number of points available for performing predictive geometry coding. In particular, points from different laser IDs may sometimes have coordinate values closer to that of the current point as compared to other coded points having the same laser ID. Accordingly, the predictive geometry coding techniques using vertical predictors of this disclosure may improve coding efficiency. In general, a point cloud encoder and decoder may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry decoding.

Figure 1:
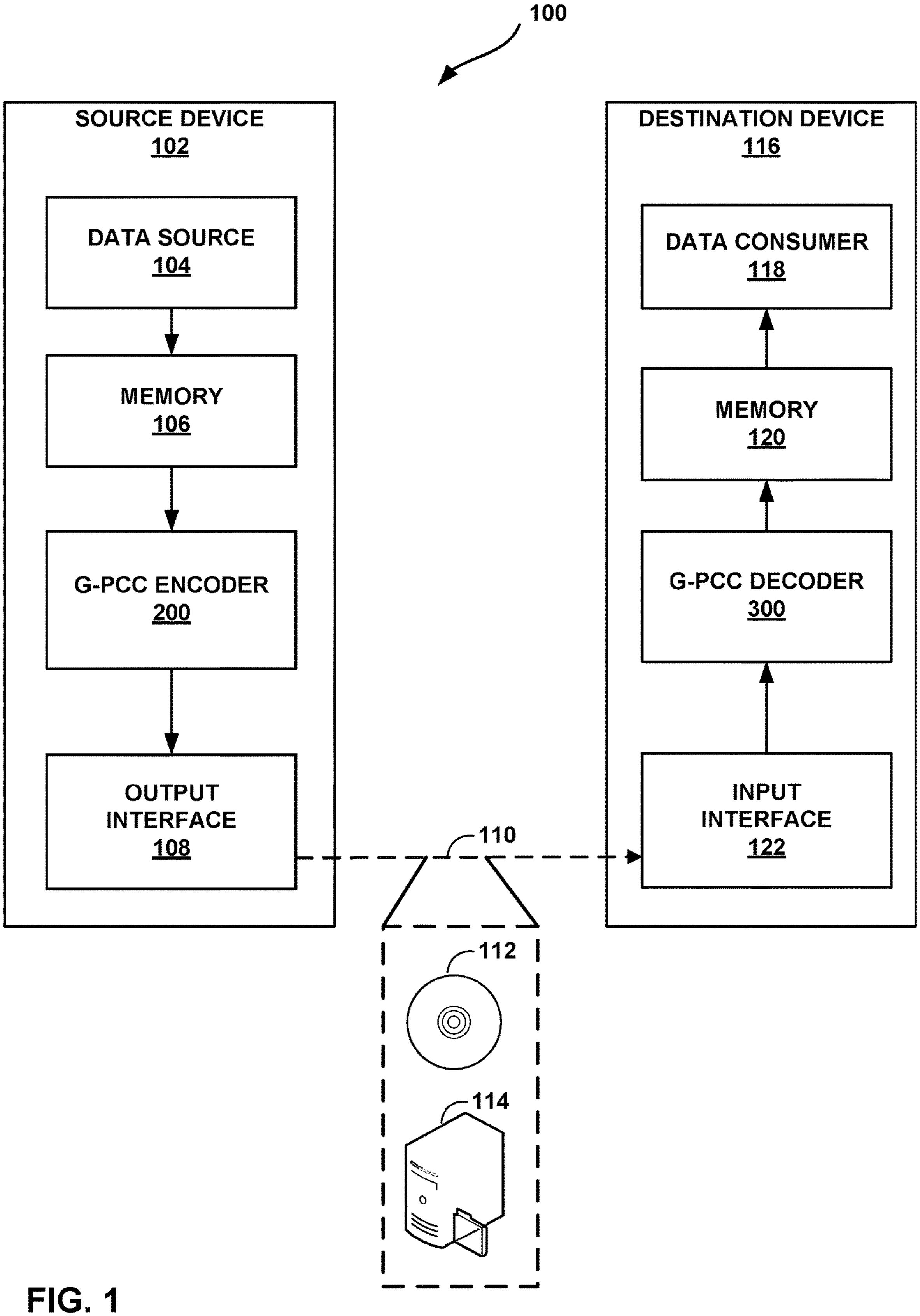
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to vertical prediction in G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

As will be described in more detail below, G-PCC encoder 200 and G-PCC decoder 300 may be configured to code point cloud data using the techniques of this disclosure, including coding point cloud data using predictive geometry coding and a vertical predictor. In one example of the disclosure, G-PCC encoder 200 and G-PCC decoder 300 may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry coding.

System 100 as shown in FIG. 1 is merely one example. In general, other digital encoding and/or decoding devices may perform the techniques of this disclosure related to vertical prediction in G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11), and more recently ISO/IEC MPEG 3DG (JTC 1/SC29/WG 7), is studying the standardization of point cloud coding technology with a compression capability that significantly exceeds that of the current approaches. MPEG is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in Text of ISO/IEC FDIS 23090-9 Geometry-based Point Cloud Compression, ISO/IEC JTC 1/SC29/WG 7 m55637, Teleconference, October 2020. and a description of the codec is available in G-PCC Codec Description, ISO/IEC JTC 1/SC29/WG 7 MDS20983, Teleconference, October 2021.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
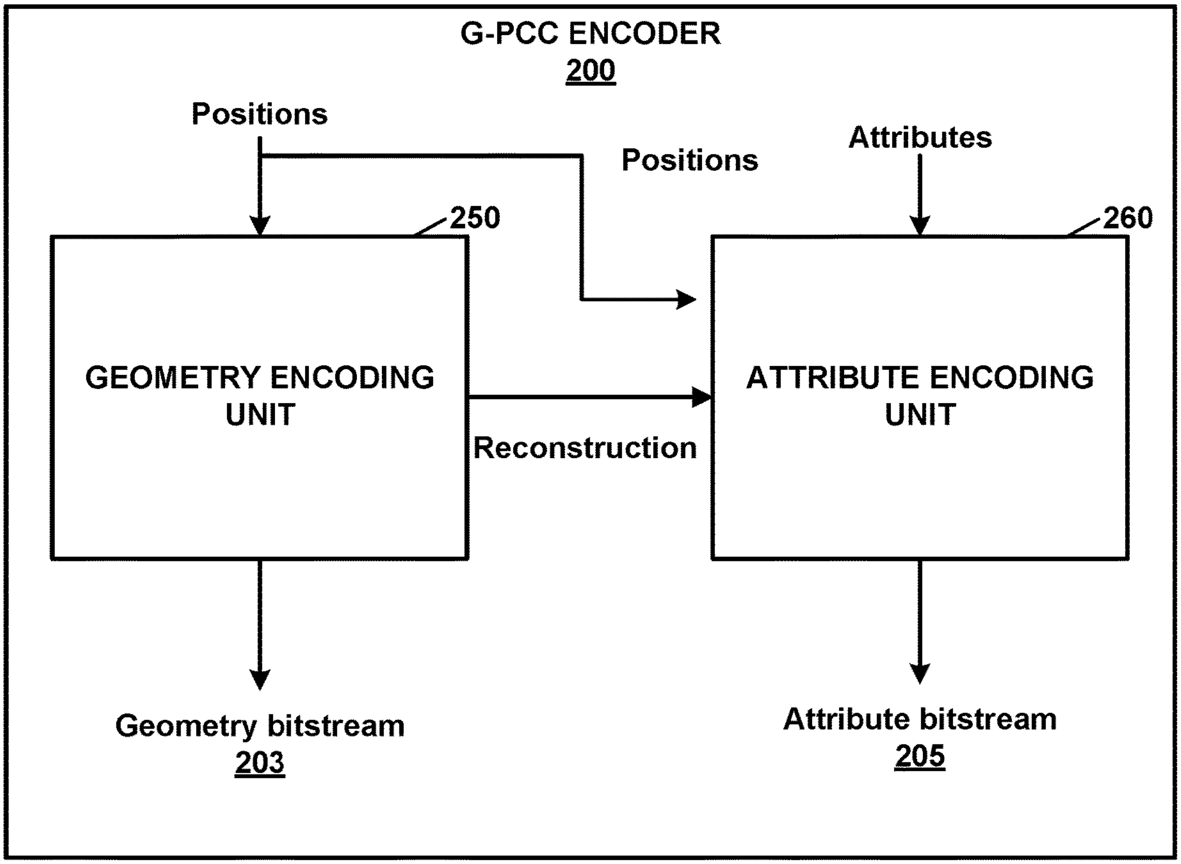
FIG. 2 is a block diagram illustrating an example Geometry Point Cloud Compression (G-PCC) encoder.
Figure 3:
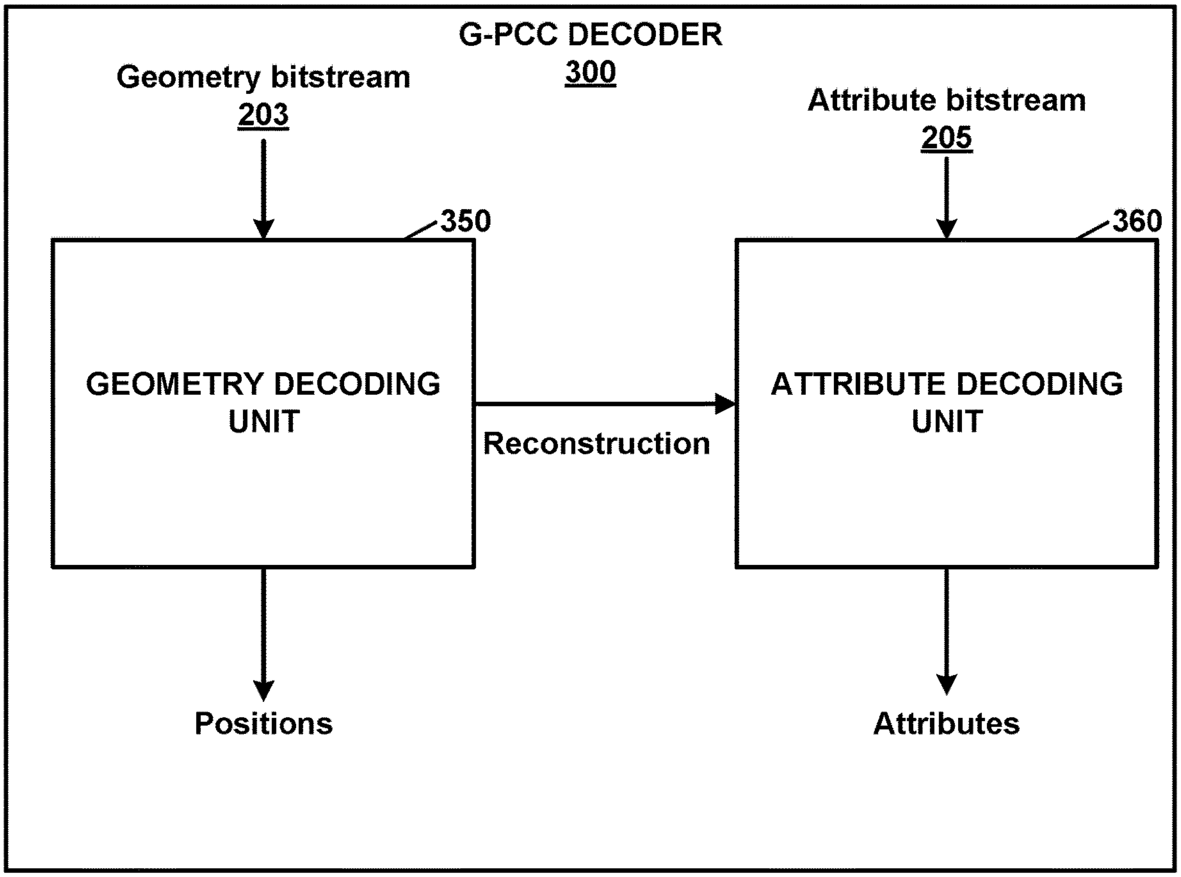
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code. In the example of FIG. 2, G-PCC encoder 200 may include a geometry encoding unit 250 and an attribute encoding unit 260. In general, geometry encoding unit 250 is configured to encode the positions of points in the point cloud frame to produce geometry bitstream 203. Attribute encoding unit 260 is configured to encode the attributes of the points of the point cloud frame to produce attribute bitstream 205. As will be explained below, attribute encoding unit 260 may also use the positions, as well as the encoded geometry (e.g., the reconstruction) from geometry encoding unit 250 to encode the attributes.

In the example of FIG. 3, G-PCC decoder 300 may include a geometry decoding unit 350 and an attribute decoding unit 360. In general, geometry encoding unit 350 is configured to decode the geometry bitstream 203 to recover the positions of points in the point cloud frame. Attribute decoding unit 360 is configured to decode the attribute bitstream 205 to recover the attributes of the points of the point cloud frame. As will be explained below, attribute decoding unit 360 may also use the positions from the decoded geometry (e.g., the reconstruction) from geometry decoding unit 350 to encode the attributes.

In both G-PCC encoder 200 and G-PCC decoder 300, point cloud positions are coded first. Attribute coding depends on the decoded geometry. In FIGS. 5-8 of this disclosure, the coding units with vertical hashing are options typically used for Category 1 data. Diagonal-crosshatched coding units are options typically used for Category 3 data. All the other modules are common between Categories 1 and 3.

For geometry, two different types of coding techniques exist: Octree and predictive-tree coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Figure 4:
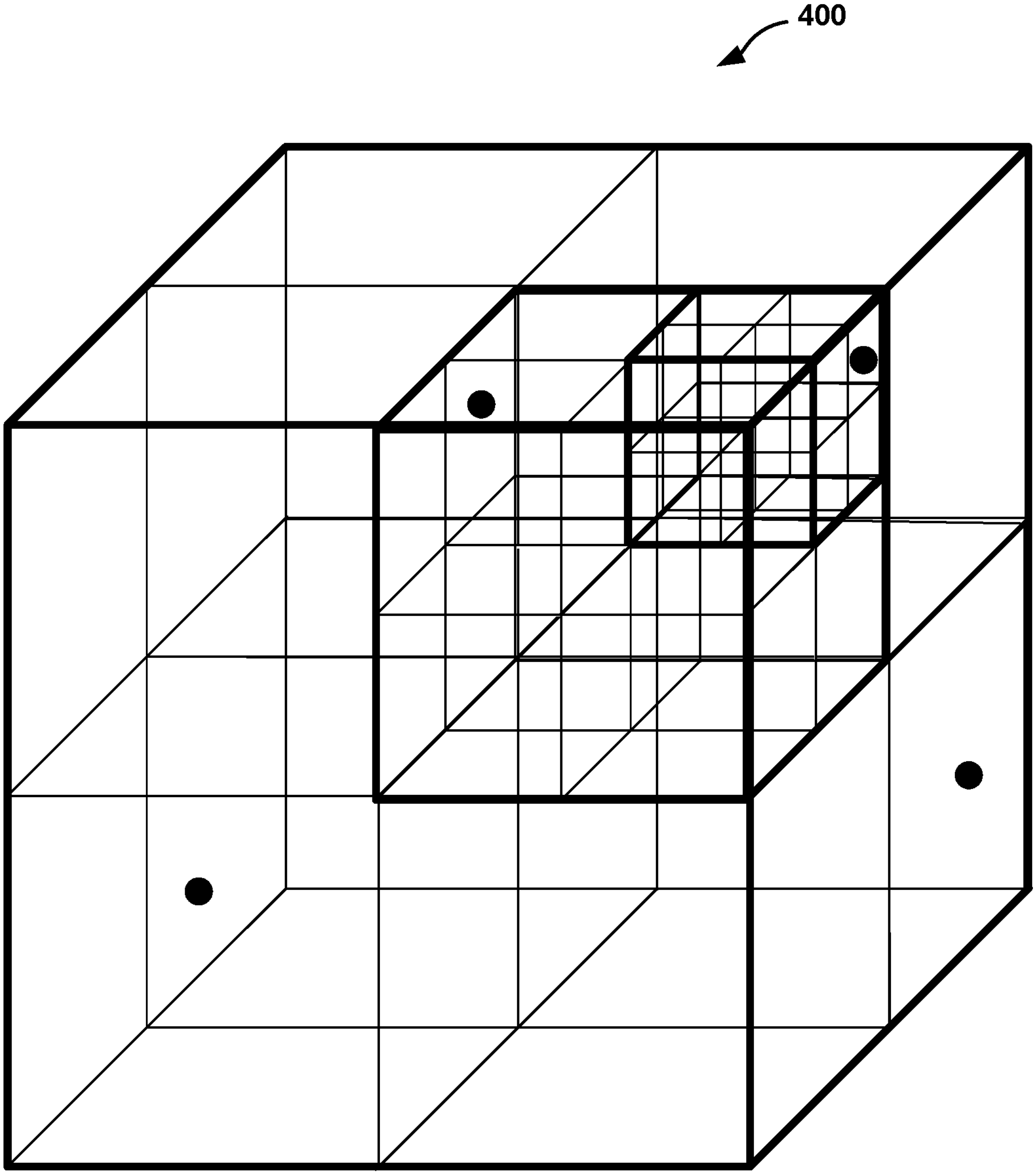
FIG. 4 is a conceptual diagram illustrating an example octree split for geometry coding.

FIG. 4 is a conceptual diagram illustrating an example octree split for geometry coding. At each node of octree 400, G-PCC encoder 200 may signal an occupancy to G-PCC decoder 300 (when the occupancy is not inferred by G-PCC decoder 300) for one or more of a node's child nodes (e.g., up to eight nodes). Multiple neighborhoods are specified including (a) nodes that share a face with a current octree node, (b) nodes that share a face, edge or a vertex with the current octree node, etc. Within each neighborhood, the occupancy of a node and/or the node's children may be used to predict the occupancy of the current node or the node's children. For points that are sparsely populated in certain nodes of the octree, the codec also supports a direct coding mode where the 3D position of the point is encoded directly. G-PCC encoder 200 may signal a flag to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either technique may be used for any data, and, just like with the geometry codecs in G-PCC, the attribute coding technique used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

Figure 5:
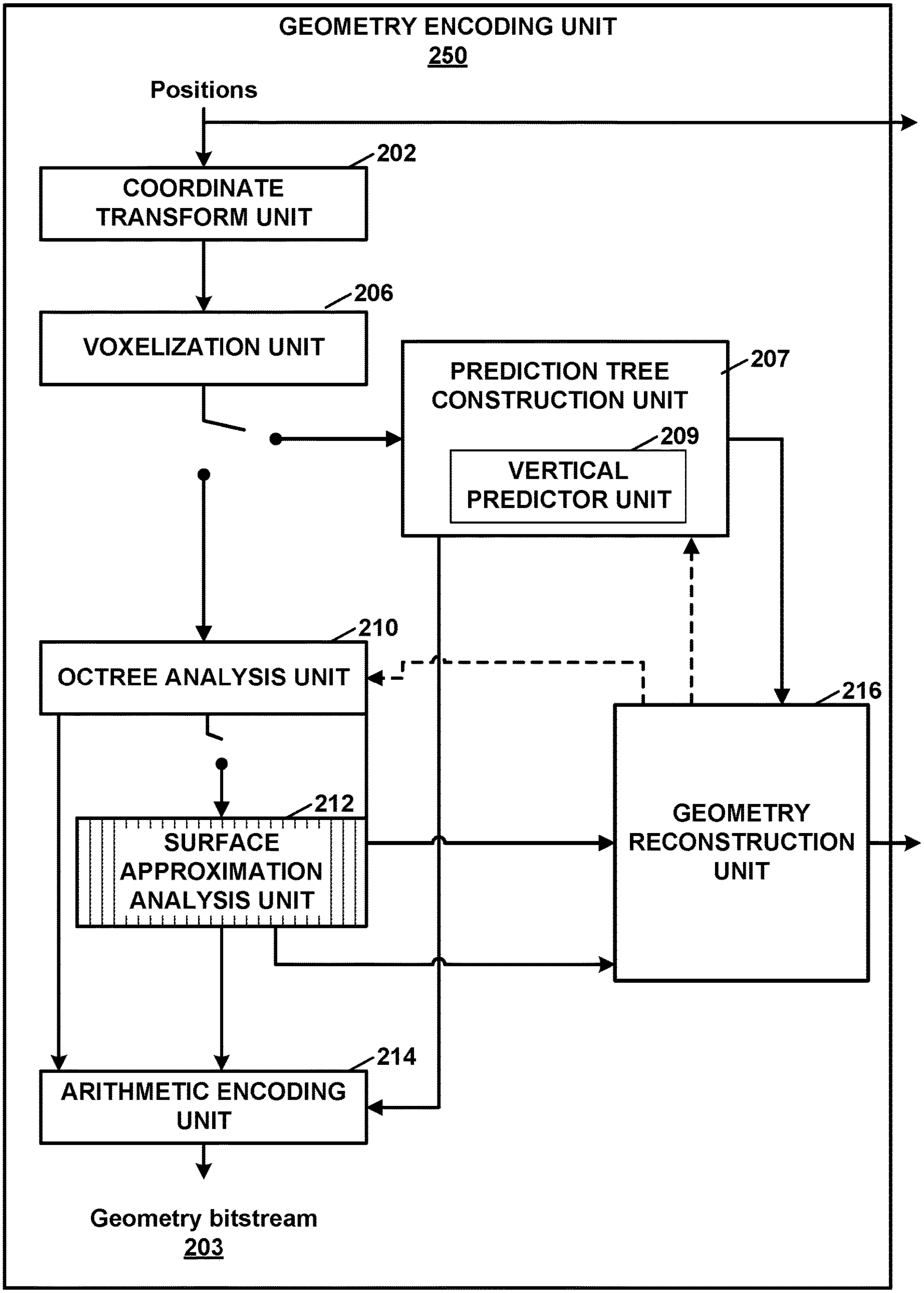
FIG. 5 is a block diagram illustrating an example geometry encoding unit of FIG. 2 in more detail.

FIG. 5 is a block diagram illustrating an example of geometry encoding unit 250 of FIG. 2 in more detail. Geometry encoding unit 250 may include a coordinate transform unit 202, a voxelization unit 206, a predictive tree construction unit 207, an octree analysis unit 210, a surface approximation analysis unit 212, an arithmetic encoding unit 214, and a geometry reconstruction unit 216.

As shown in the example of FIG. 5, geometry encoding unit 250 may obtain a set of positions of points in the point cloud. In one example, geometry encoding unit 250 may obtain the set of positions of the points in the point cloud and the set of attributes from data source 104 (FIG. 1). The positions may include coordinates of points in a point cloud. Geometry encoding unit 250 may generate a geometry bitstream 203 that includes an encoded representation of the positions of the points in the point cloud.

Coordinate transform unit 202 may apply a transform to the coordinates of the points to transform the coordinates from an initial domain to a transform domain. This disclosure may refer to the transformed coordinates as transform coordinates. Voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously-encoded frames from geometry reconstruction unit 216. Dashed lines from geometry reconstruction unit 216 show data paths when inter-prediction is performed. Arithmetic encoding unit 214 may entropy encode syntax elements representing the encoded prediction tree.

In some examples, prediction tree construction unit 207 may include vertical predictor unit 209. Vertical predictor unit 209 may be configured to encode point cloud data using the techniques of this disclosure, including encoding point cloud data using predictive geometry coding and a vertical predictor. In one example of the disclosure, G-PCC encoder 200 may be configured to determine a pivot laser ID, determine a vertical predictor for a current point of the point cloud data, wherein the vertical predictor is based on a second point having a second laser ID different than the pivot laser ID, and encode the current point using the vertical predictor and predictive geometry encoding.

Instead of performing prediction tree based coding, geometry encoding unit 250 may perform octree based coding. Octree analysis unit 210 may generate an octree based on the voxelized transform coordinates. Surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. Geometry encoding unit 250 may output these syntax elements in geometry bitstream 203. Geometry bitstream 203 may also include other syntax elements, including syntax elements that are not arithmetically encoded.

Octree-based coding may performed either as intra-prediction techniques or inter-prediction techniques. In order to perform octree tree coding using inter-prediction, octree analysis unit 210 and surface approximation analysis unit 212 may access points from previously-encoded frames from geometry reconstruction unit 216. Dashed lines from geometry reconstruction unit 216 show data paths when inter-prediction is performed.

Geometry reconstruction unit 216 may reconstruct transform coordinates of points in the point cloud based on the octree, the predictive tree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points.

Figure 6:
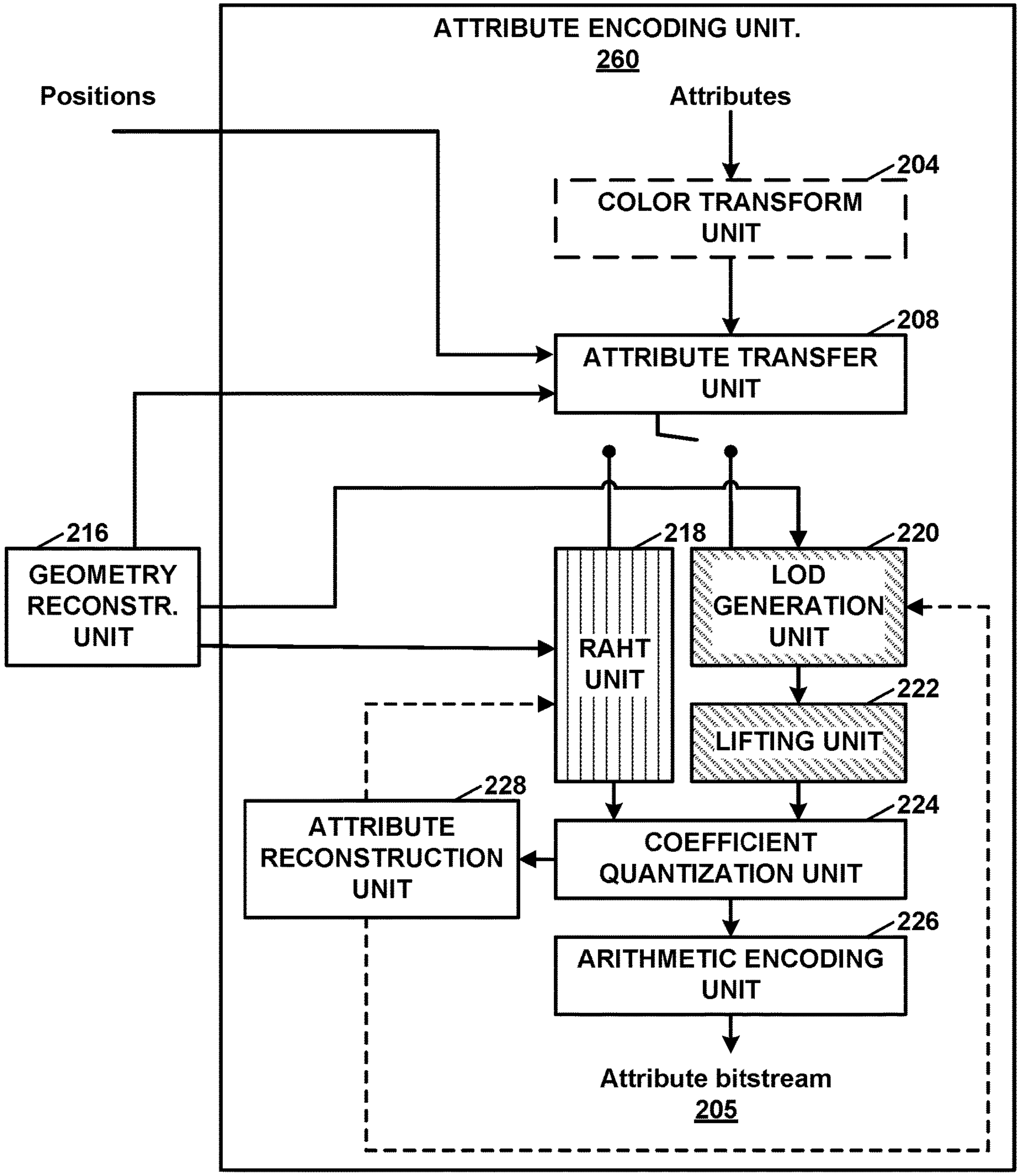
FIG. 6 is a block diagram illustrating an example attribute encoding unit of FIG. 2 in more detail.

FIG. 6 is a block diagram illustrating an example of attribute encoding unit 260 of FIG. 2 in more detail. Attribute encoding unit 250 may include a color transform unit 204, an attribute transfer unit 208, an RAHT unit 218, a LoD generation unit 220, a lifting unit 222, a coefficient quantization unit 224, an arithmetic encoding unit 226, and an attribute reconstruction unit 228. Attribute encoding unit 260 may encode the attributes of the points of a point cloud to generate an attribute bitstream 205 that includes an encoded representation of the set of attributes. The attributes may include information about the points in the point cloud, such as colors associated with points in the point cloud.

Color transform unit 204 may apply a transform to transform color information of the attributes to a different domain. For example, color transform unit 204 may transform color information from an RGB color space to a YCbCr color space. Attribute transfer unit 208 may transfer attributes of the original points of the point cloud to reconstructed points of the point cloud. Attribute transfer unit 208 may use the original positions of the points as well as the positions generated from attribute encoding unit 250 (e.g., from geometry reconstruction unit 216) to make the transfer.

RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LoD generation unit 220 and lifting unit 222 may apply LoD processing and lifting, respectively, to the attributes of the reconstructed points. LoD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LoD1 is obtained based on refinement level RL1, LoD2 is obtained based on RL1 and RL2, . . . LoDN is obtained by union of RL1, RL2, . . . RLN. In some cases, LoD generation may be followed by a prediction scheme (e.g., predicting transform) where attributes associated with each point in the LoD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

Like geometry encoding unit 250, attribute encoding unit 260 may encode the attributes using either intra-prediction or inter-prediction techniques. The above description of attribute encoding unit 260 generally describes intra-prediction techniques. In other examples, RAHT unit 215, LoD generation unit 220, and/or lifting unit 222 may also use attributes from previously-encoded frames to further encode the attributes of the current frame. In this regard, attribute reconstructions unit 228 may be configured to reconstruct the encoded attributes and store them for possible future use in inter-prediction encoding. Dashed lines from attribute reconstruction unit 228 show data paths when inter-prediction is performed.

Figure 7:
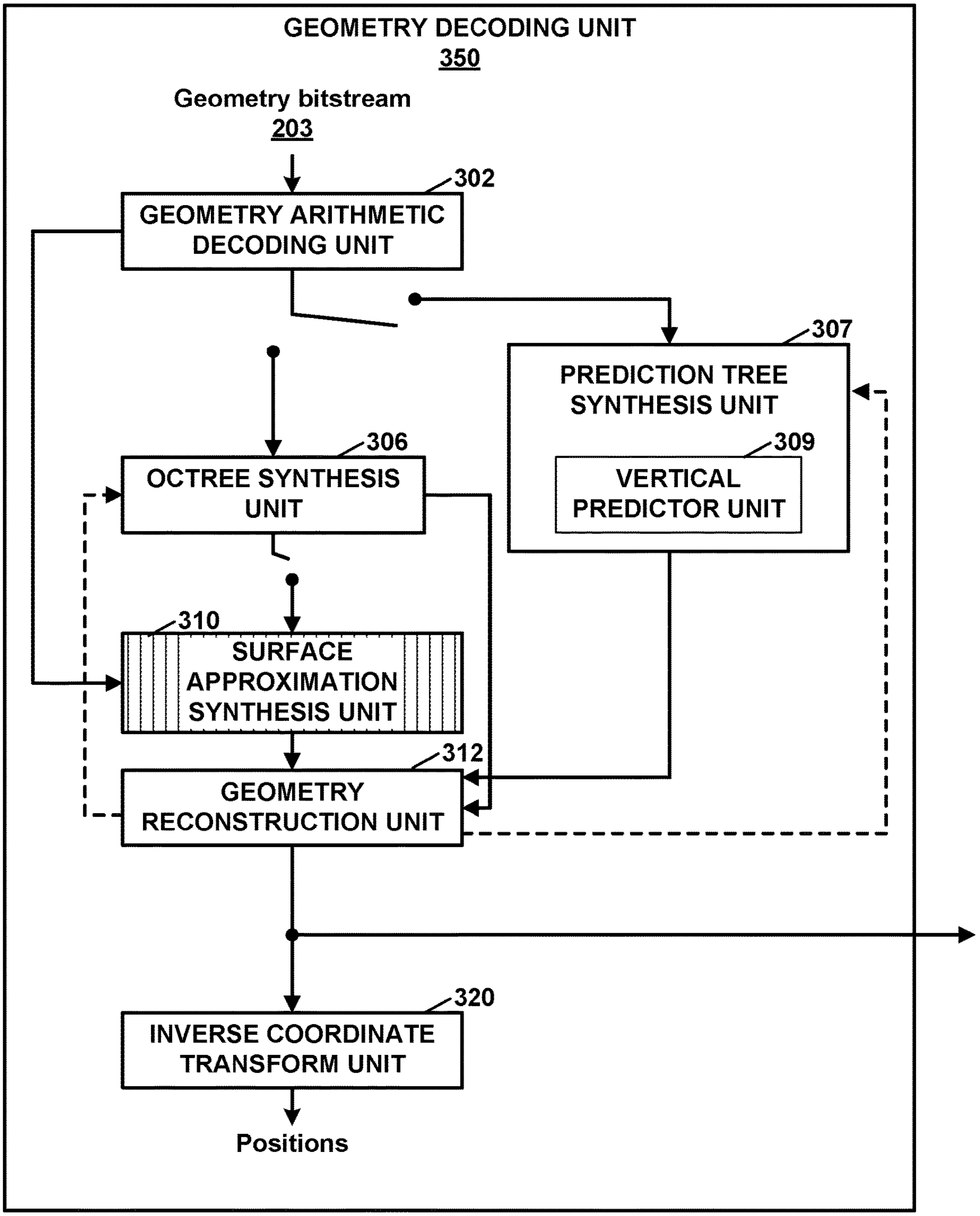
FIG. 7 is a block diagram illustrating an example geometry decoding unit of FIG. 3 in more detail.

FIG. 7 is a block diagram illustrating an example geometry decoding unit 350 of FIG. 3 in more detail. Geometry decoding unit 350 may be configured to perform the reciprocal process to that performed by geometry encoding unit 250 of FIG. 5. Geometry decoding unit 350 receives geometry bitstream 203 and produces positions of the points of a point cloud frame. Geometry decoding unit 350 may include a geometry arithmetic decoding unit 302, an octree synthesis unit 306, a prediction tree synthesis unit 307, a surface approximation synthesis unit 310, a geometry reconstruction unit 312, and an inverse coordinate transform unit 320.

Geometry decoding unit 350 may receive geometry bitstream 203. Geometry arithmetic decoding unit 302 may apply arithmetic decoding (e.g., Context-Adaptive Binary Arithmetic Coding (CAB AC) or other type of arithmetic decoding) to syntax elements in geometry bitstream 203.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level.

At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree. Octree-based coding may performed either as intra-prediction techniques or inter-prediction techniques. In order to perform octree tree coding using inter-prediction, octree synthesis unit 306 and surface approximation synthesis unit 310 may access points from previously-decoded frames from geometry reconstruction unit 312. Dashed lines from geometry reconstruction unit 312 show data paths when inter-prediction is performed.

Prediction tree synthesis unit may synthesize a prediction tree based on syntax elements parsed from geometry bitstream 203. Prediction tree synthesis unit 307 may be configured to synthesize the prediction tree using any of the techniques described above, including using both intra-prediction techniques or intra-prediction techniques. In order to perform prediction tree coding using inter-prediction, prediction tree synthesis unit 307 may access points from previously-decoded frames from geometry reconstruction unit 312. Dashed lines from geometry reconstruction unit 312 show data paths when inter-prediction is performed.

In some examples, prediction tree synthesis unit 307 may include vertical predictor unit 309. Vertical predictor unit 309 may be configured to decode point cloud data using the techniques of this disclosure, including decoding point cloud data using predictive geometry coding and a vertical predictor. In one example of the disclosure, G-PCC decoder 300 may be configured to determine a pivot laser ID, determine a vertical predictor for a current point of the point cloud data, wherein the vertical predictor is based on a second point having a second laser ID different than the pivot laser ID, and decode the current point using the vertical predictor and predictive geometry decoding.

Geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Figure 8:
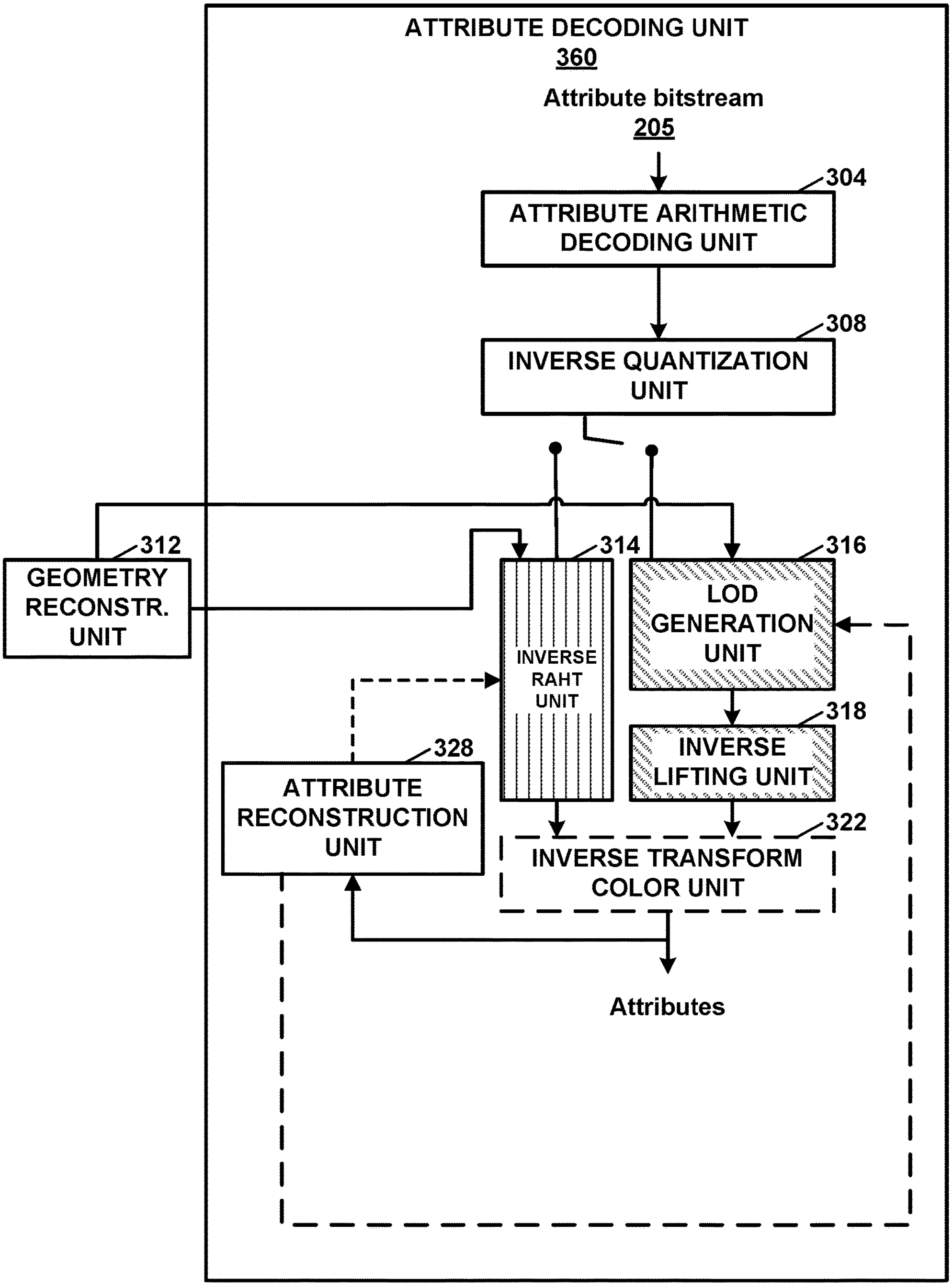
FIG. 8 is a block diagram illustrating an example attribute decoding unit of FIG. 3 in more detail.

FIG. 8 is a block diagram illustrating an example attribute decoding unit 360 of FIG. 3 in more detail. Attribute decoding unit 360 may be configured to perform the reciprocal process to that performed by attribute encoding unit 260 of FIG. 6. Attribute decoding unit 360 receives attribute bitstream 205 and produces attributes of the points of a point cloud frame. Attribute decoding unit 356 may include an attribute arithmetic decoding unit 304, an inverse quantization unit 308, an inverse RAHT unit 314, an LoD generation unit 316, an inverse lifting unit 318, an inverse transform color unit 322, and an attribute reconstruction unit 328.

Attribute arithmetic decoding unit 304 may apply arithmetic decoding to syntax elements in attribute bitstream 205. Inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, inverse RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LoD generation unit 316 and inverse lifting unit 318 may determine color values for points of the point cloud using a level of detail-based technique. LoD generation unit 316 decodes each LoD giving progressively finer representations of the attribute of points. With a predicting transform, LoD generation unit 316 derives the prediction of the point from a weighted sum of points that are in prior LoDs, or previously reconstructed in the same LoD. LoD generation unit 316 may add the prediction to the residual (which is obtained after inverse quantization) to obtain the reconstructed value of the attribute. When the lifting scheme is used, LoD generation unit 316 may also include an update operator to update the coefficients used to derive the attribute values. LoD generation unit 316 may also apply an inverse adaptive quantization in this case.

Furthermore, in the example of FIG. 8, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YcbCr color space to the RGB color space.

Attribute reconstruction unit 328 may be configured to store attributes from previously-decoded frames. Attribute coding may performed either as intra-prediction techniques or inter-prediction techniques. In order to perform attribute decoding using inter-prediction, inverse RAHT unit 314 and/or LoD generation unit 316 may access attributes from previously-decoded frames from attribute reconstruction unit 328. Dashed lines from attribute reconstruction unit 328 show data paths when inter-prediction is performed.

The various units of FIGS. 5-8 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Predictive Geometry Coding

Figure 9:
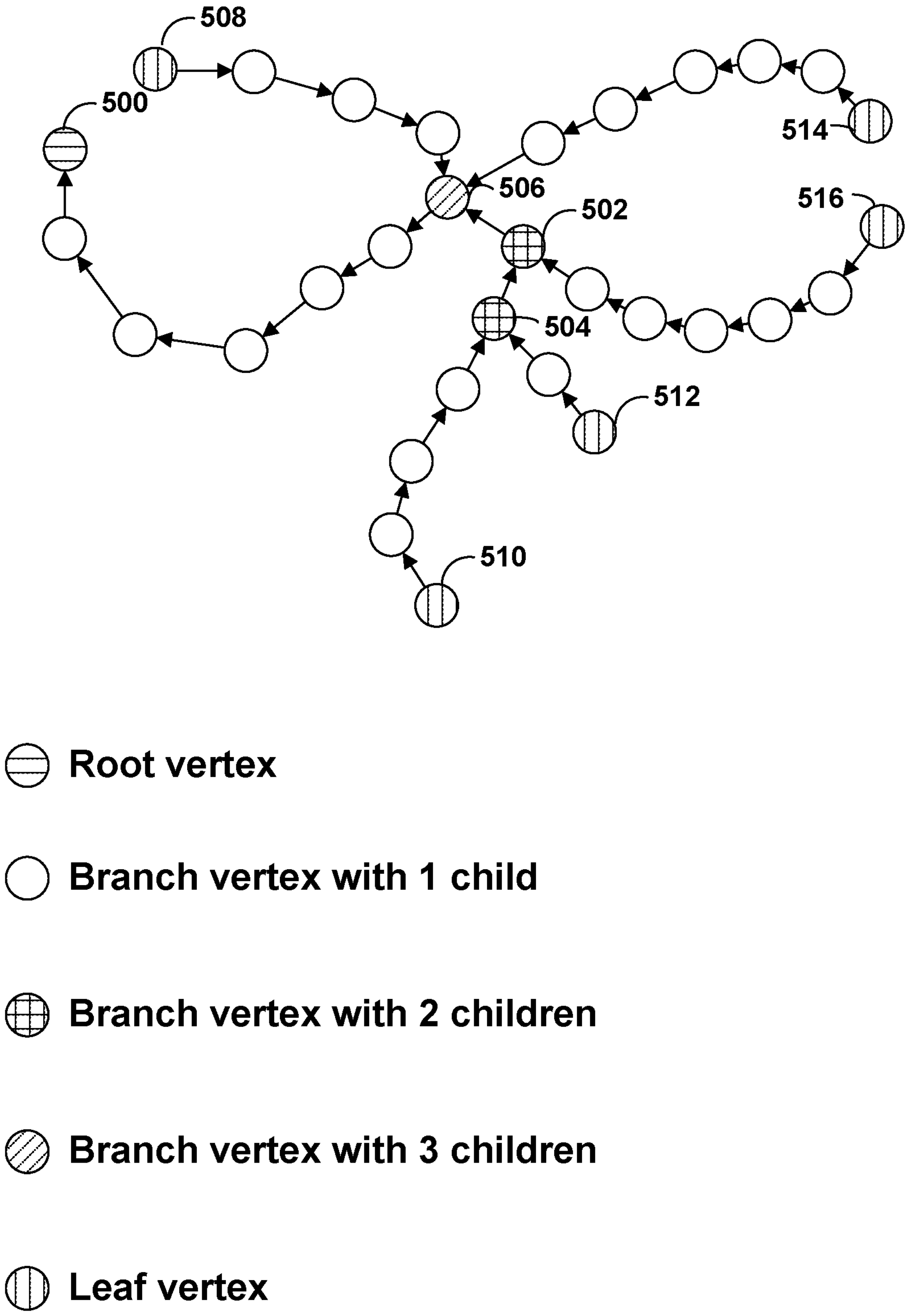
FIG. 9 is a conceptual diagram illustrating an example of a prediction tree.

Predictive geometry coding (see, e.g., G-PCC Codec Description) was introduced as an alternative to the octree geometry coding, where the nodes are arranged in a tree structure (which defines the prediction structure), and various prediction strategies are used to predict the coordinates of each node in the tree with respect to its predictors. Relative to octree coding, predictive tree coding may be more efficient for coding sparse content. FIG. 9 shows an example of a prediction tree as a directed graph where the arrows point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 9 is a conceptual diagram illustrating an example of a prediction tree. Node 500 is the root vertex and has no predictors. Nodes 502 and 504 have two children. Node 506 has 3 children. Nodes 508, 510, 512, 514, and 516 are leaf nodes and these have no children. The remaining nodes each have one child. Every node aside from root node 500 has only one parent node.

Four prediction strategies are specified for each node based on its parent (p0), grand-parent (p1) and great-grand-parent (p2):

No prediction/zero prediction (0)

Delta prediction (p0)

Linear prediction (2*p0−p1)

Parallelogram prediction (p0+p1−p2)

In the above, the p0, p1, and p2 values may represent the (x, y, z) position of each of the nodes (e.g., points). G-PCC encoder 200 may employ any algorithm to generate the prediction tree; the algorithm used may be determined based on the application/use case and several strategies may be used. Some strategies are described in the G-PCC Codec Description.

For each node, the residual coordinate values (e.g., in each of the x, y, and z directions) are coded in the bitstream starting from the root node in a depth-first manner. For example, G-PCC encoder 200 may code the residual coordinate values in the bitstream.

Predictive geometry coding may be useful for Category 3 (LIDAR-acquired) point cloud data, e.g., for low-latency applications.

Angular Mode for Predictive Geometry Coding

Figure 10A:
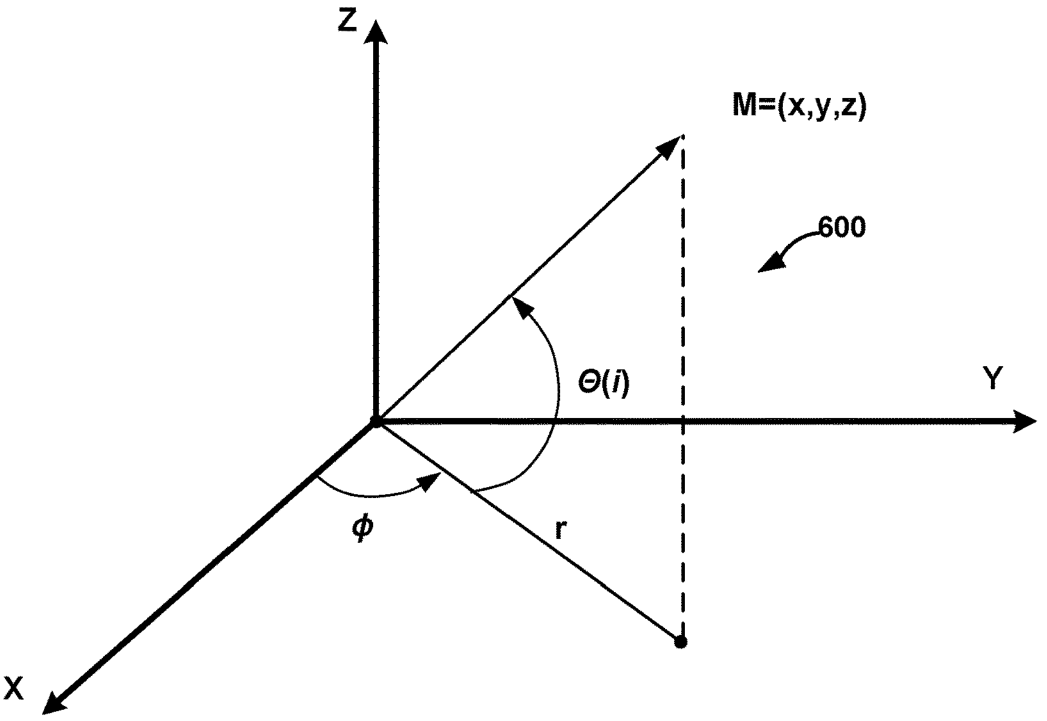
FIGS. 10A and 10B are conceptual diagrams illustrating an example of a spinning Light Detection and Ranging (LIDAR) acquisition model.
Figure 10B:
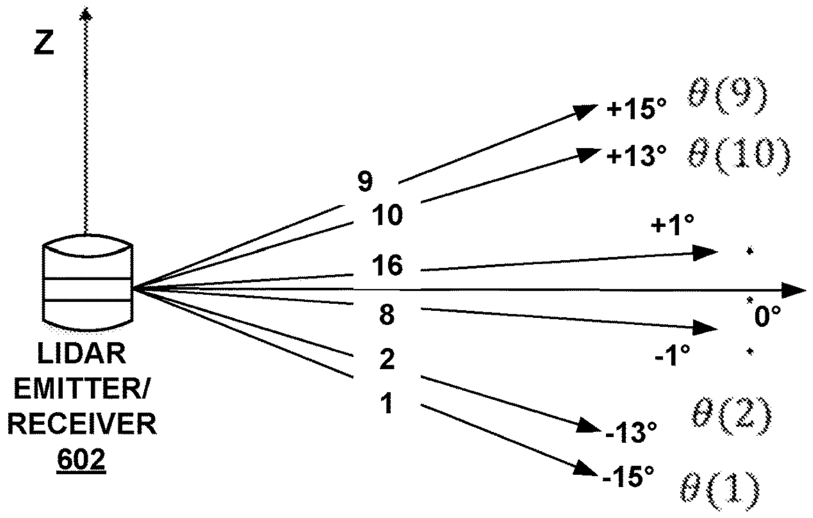

FIGS. 10A and 10B are conceptual diagrams illustrating an example of a spinning LIDAR acquisition model. Angular mode may be used in predictive geometry coding, where the characteristics of LIDAR sensors may be utilized in coding the prediction tree more efficiently. The coordinates of the positions are converted to the (r,ϕ,i) (radius, azimuth angle, and laser index (ID)) domain 600 and a prediction is performed in this domain 600 (e.g., the residuals are coded in r,ϕ,i domain). Due to the errors in rounding, coding in r,ϕ,i is not lossless and hence a second set of residuals may be coded which correspond to the Cartesian coordinates. A description of the encoding and decoding strategies used for angular mode for predictive geometry coding is reproduced below from the G-PCC Codec Description.

The technique focuses on point clouds acquired using a spinning LIDAR model. Here, LIDAR 602 has N lasers (e.g., N=16, 32, 64) spinning around the Z axis according to an azimuth angle ϕ. Each laser may have different elevation $\theta(i)_{i=1 \ldots N}$ and height $\varsigma(i)_{i=1 \ldots N}$. Suppose that the laser i hits a point M, with cartesian integer coordinates (x,y,z), defined according to the coordinate system shown in FIGS. 10A-10B.

This technique models the position of M with three parameters (r,ϕ,i), which are computed as follows:

$$r = \sqrt{x^2 + y^2}$$

$$\phi = a\tan2(y, x)$$

$$i = \arg\min_{j=1 \ldots N} \{z + \varsigma(j) - r \times \tan(\theta(j))\},$$

In the above equations r is the radius, ϕ is the azimuth angle, θ is the elevation angle, and i is a laser ID.

More precisely, the technique uses the quantized version of (r,ϕ,i), denoted $(\tilde{r},\tilde{\phi},i)$, where the three integers $\tilde{r}$, $\tilde{\phi}$ and i are computed as follows:

$$\tilde{r} = \text{floor}\left(\frac{\sqrt{x^2+y^2}}{q_r} + o_r\right) = hypot(x, y)$$

$$\tilde{\phi} = \text{sign}\ (a\tan 2(y, x)) \times \text{floor}\left(\frac{|a\tan 2(y, x)|}{q_\phi} + o_\phi\right)$$

$$i = \arg \min_{j=1 \ldots N} \{z + \varsigma(j) - r \times \tan(\theta(j))\}$$

where $(q_r, o_r)$ and $(g_\phi, o_\phi)$ are quantization parameters controlling the precision of $\tilde{\phi}$ and $\tilde{r}$, respectively.sign(t) is a function that returns 1 if t is positive and (−1) otherwise. |t| is the absolute value of t.

To avoid reconstruction mismatches due to the use of floating-point operations, the values of $\varsigma(i)_{i=1 \ldots N}$ and $\tan(\theta(i))_{i=1 \ldots N}$ are pre-computed and quantized as follows:

$$\tilde{z}(i) = \text{sign}\ (\varsigma(i)) \times \text{floor}\left(\frac{|\varsigma(i)|}{q_\varsigma} + o_\varsigma\right)$$

$$\tilde{t}(i) = \text{sign}\ (\varsigma(\tan(\theta(j))) \times \text{floor}\left(\frac{|\tan(\theta(j)|}{q_\theta} + o_\theta\right)$$

where $(q_\varsigma, o_\varsigma)$ and $(g_\theta, o_\theta)$ are quantization parameters controlling the precision of $\tilde{\varsigma}$ and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi)) =$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\varsigma),$$

where app_cos (·) and app_sin(·) are approximations of cos(·) and sin(·). The calculations could be performed using a fixed-point representation, a look-up table, and/or linear interpolation.

Note that $(\hat{x}, \hat{y}, \hat{z})$ may be different from (x,y,z) due to various reasons, such as quantization, approximations, model imprecision, model parameters imprecisions, or the like.

Let $(re_x, re_y, re_z)$ be the reconstruction residuals defined as follows:

$$re_x = x - \hat{x}$$

$$re_y = y - \hat{y}$$

$$re_z = z - \hat{z}$$

With this technique, G-PCC encoder 200 may proceed as follows:

1) Encode the model parameters $\tilde{t}(i)$ and $\tilde{z}(i)$ and the quantization parameters $q_r$, $q_\varsigma$, $g_\theta$ and $q_\phi$.
2) Apply a geometry prediction scheme to the representation $(\tilde{r}, \tilde{\phi}, i)$.
   A new predictor leveraging the characteristics of LIDAR may be introduced. For instance, the rotation speed of the LIDAR scanner around the z-axis is usually constant. Therefore, G-PCC encoder 200 predicts the current $\tilde{\phi}(j)$ as follows:

$$\tilde{\phi}(j) = \tilde{\phi}(j-1) + n(j) \times \delta_\phi(k)$$

Where $(\delta_\phi(k))_{k=1 \ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note that in some examples the phi multiplier is used only with the delta predictor.
3) Encode with each node the reconstruction residuals $(re_x, re_y, re_z)$.

G-PCC decoder 300 may proceed as follows:

1) Decode the model parameters $\tilde{t}(i)$ and $\tilde{z}(i)$ and the quantization parameters $q_r$, $q_\varsigma$, $q_\theta$ and $q_\phi$.
2) Decode the $(\tilde{r}, \tilde{\phi}, i)$ parameters associated with the nodes according to a geometry prediction scheme.
3) Compute the reconstructed coordinates $(\hat{x}, \hat{y}, \hat{z})$ as described above.
4) Decode the residuals $(re_x, re_y, re_z)$
   As discussed in the next section, lossy compression could be supported by quantizing the reconstruction residuals $(re_x, re_y, re_z)$
5) Compute the original coordinates (x,y,z) as follows:

$$x = re_x + \hat{x}$$

$$y = re_y + \hat{y}$$

$$z = re_z + \hat{z}$$

Lossy compression may be achieved by applying quantization to the reconstruction residuals $(re_x, re_y, re_z)$ or by dropping points.

The quantized reconstruction residuals may be computed as follows:

$$\tilde{re}_x = \text{sign}\ (re_x) \times \text{floor}\left(\frac{|re_x|}{q_x} + o_x\right)$$

$$\tilde{re}_y = \text{sign}\ (re_y) \times \text{floor}\left(\frac{|re_y|}{q_y} + o_y\right)$$

$$\tilde{re}_z = \text{sign}\ (re_z) \times \text{floor}\left(\frac{|re_z|}{q_z} + o_z\right)$$

Where $(q_x, o_x)$, $(q_y, o_y)$ and $(q_z, o_z)$ are quantization parameters controlling the precision of $\tilde{re}_x$, $\tilde{re}_y$ and $\tilde{re}_z$, respectively. For example, G-PCC encoder 200 and G-PCC decoder 300 may compute the quantized residuals.

G-PCC encoder 200 and G-PCC decoder 300 may use trellis quantization to further improve the RD (rate-distortion) performance results.

The quantization parameters may change at sequence/frame/slice/block level to achieve region adaptive quality and/or for rate control purposes.

Several other improvements to predictive geometry have been proposed. A summary of improvements that are related to this disclosure are presented herein.

Inter Prediction for Predictive Geometry Coding

Predictive geometry coding uses a prediction tree structure to predict the positions of points. When angular coding is enabled, the x, y, z coordinates are transformed to radius, azimuth and laser ID and residuals may be signaled in these three coordinates as well as in the x, y, z dimensions. The intra prediction used for radius, azimuth and laser ID may be one of four modes and the predictors are nodes that are classified as parent, grand-parent, and great-grandparent in the prediction tree with respect to the current node. The predictive geometry coding, as designed in G-PCC Ed.1, is an intra coding tool as it only uses points in the same frame for prediction. Additionally, using points from previously decoded frames may provide a better prediction and thus better compression performance.

For inter prediction, it was initially proposed to predict the radius of a point from a reference frame. For each point in the prediction tree, G-PCC decoder 300 may determine whether the point is inter predicted or intra predicted. For example, G-PCC encoder 200 may indicate such inter prediction or intra prediction by a flag which G-PCC encoder 200 may signal in the bitstream. When intra predicted, the intra prediction modes of predictive geometry coding are used. When inter-prediction is used, the azimuth and laser ID are still predicted with intra prediction, while the radius is predicted from the point in the reference frame that has the same laser ID as the current point and an azimuth that is closest to the current azimuth.

A further change to this technique enables inter prediction of the azimuth and laser ID in addition to radius prediction. When inter-coding is applied, the radius, azimuth and laser ID of the current point are predicted based on a point that is near the azimuth position of a previously decoded point in the reference frame. In addition, separate sets of contexts are used for inter and intra prediction.

Figure 11:
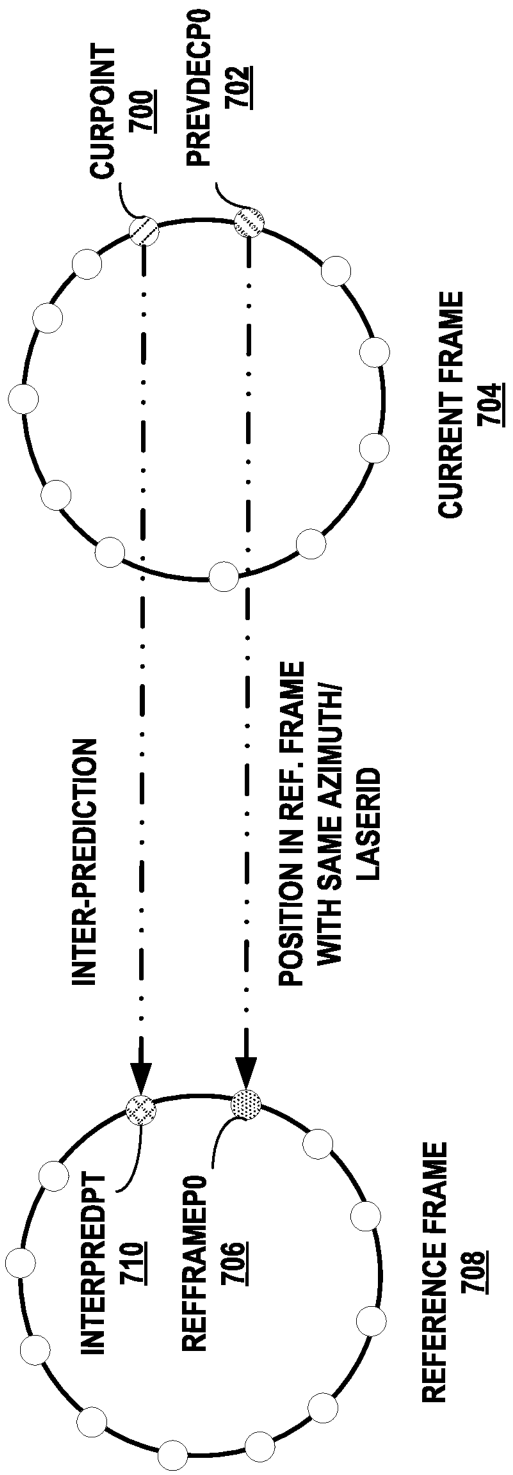
FIG. 11 is a conceptual diagram illustrating an example of inter-prediction of a current point from a point in a reference frame.

FIG. 11 is a conceptual diagram illustrating an example of inter-prediction of a current point from a point in a reference frame. The extension of inter prediction to azimuth, radius, and laser ID includes the following steps which, for example, may be performed by G-PCC decoder 300:

1) For a given point (e.g., the current point curPoint 700 in current frame 704), choose the previous decoded point (prevDecP0 702).
2) Choose a position (e.g., refFrameP0 706) in reference frame 708 that has same scaled azimuth and laser ID as prevDecP0 702.
3) In reference frame 708, find the first point (interPredPt 710) that has azimuth greater than that of refFrameP0 706. interPredPt 710 may also be referred to as the "Next" inter predictor.

Figure 12:
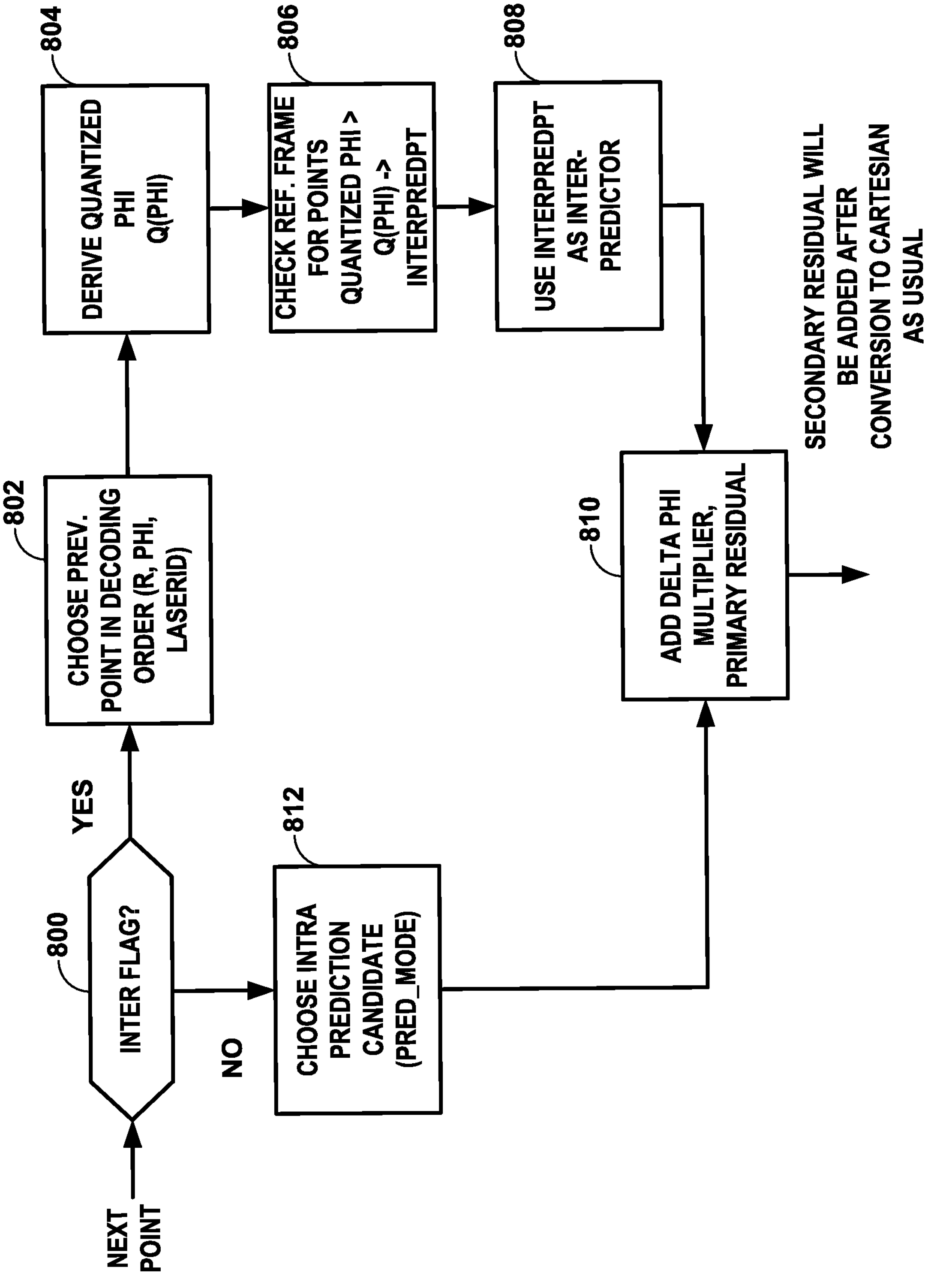
FIG. 12 is a flow diagram illustrating operation of a G-PCC decoder.

FIG. 12 is a flow diagram illustrating operation of a G-PCC decoder. FIG. 12 illustrates the decoding flow associated with the "inter_flag" that is signalled for every point. G-PCC decoder 300 may determine whether the inter flag is true (e.g., equal to 1) (800). If the inter flag is true (the "YES" path from block 800), G-PCC decoder 300 may choose a previously decoded point in decoding order using radius, azimuth, and laser ID (802). G-PCC decoder 300 may derive a quantized phi, Q(phi) (e.g., a quantized value of the azimuth) of the chosen previously decoded point (e.g., prevDecP0 702) (804). G-PCC decoder 300 may check the reference frame (e.g., reference frame 708 of FIG. 11) for points where the quantized phi value of such points is greater than Q(phi), which may lead to interPredPt 710 (806). G-PCC decoder 300 may then use interPredPt 710 as an inter-predictor for the current point, curPoint 700 (808). G-PCC decoder 300 may then add a delta phi multiplier, e.g., $n(j)\times\delta_{\varphi}(k)$ as discussed above, to the primary residual (810).

If the inter flag is false (e.g., is equal to 0) (the "NO" path from block 800), G-PCC decoder 300 may choose an intra prediction candidate (812) and apply intra prediction. G-PCC decoder 300 may G-PCC decoder 300 may then add a delta phi multiplier to yield the primary residual (810).

Additional Predictor Candidate

Figure 13:
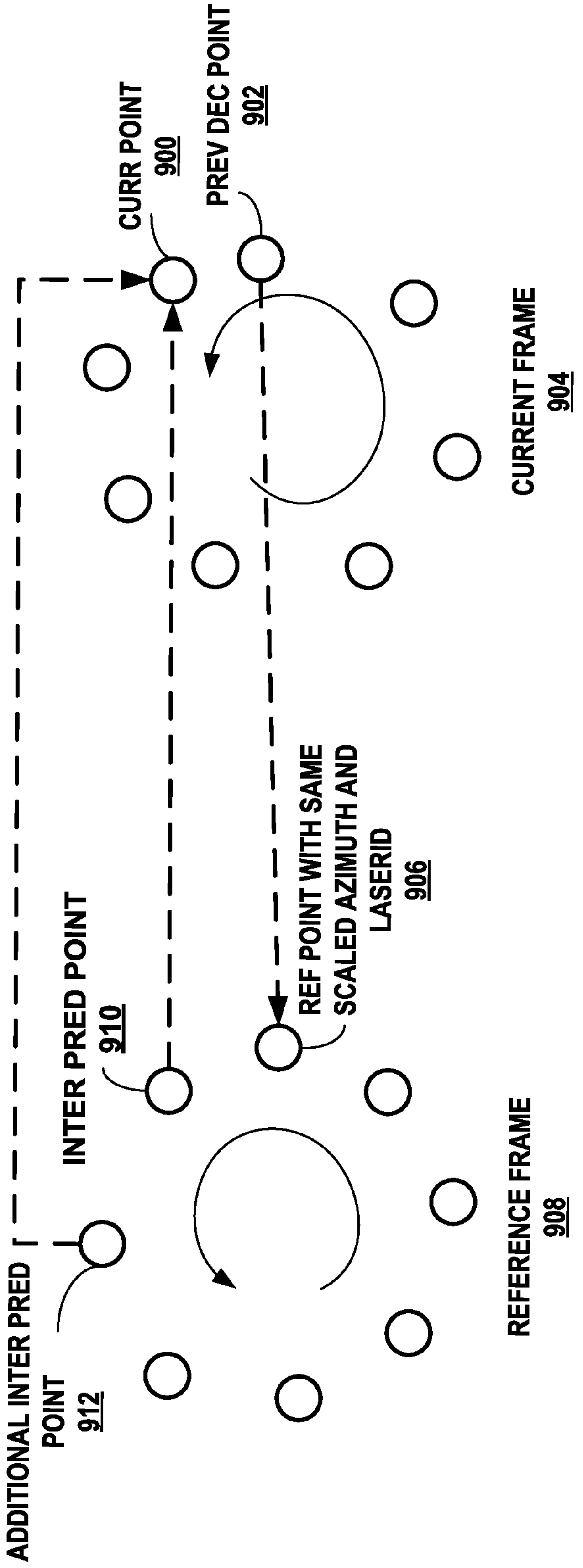
FIG. 13 is a conceptual diagram illustrating an example of an additional inter predictor point obtained from the first point that has an azimuth greater than the inter predictor point.

FIG. 13 is a conceptual diagram illustrating an example of an additional inter predictor point obtained from the first point that has an azimuth greater than the inter predictor point. In the inter prediction technique for predictive geometry described above, the radius, azimuth and laser ID of the current point are predicted based on a point that is near the collocated azimuth position in the reference frame when inter coding is applied, for example, by G-PCC decoder 300, using the following steps:

1) for a given point (e.g., a current point, Curr Point 900), choose the previous decoded point (e.g., Prev Dec Point 902),
2) choose a position (e.g., Ref Point 906) in reference frame 908 that has the same scaled azimuth and laser ID as the previous decoded point (e.g., Prev Dec Point 902),
3) choose a position (Inter Pred Point 910) in reference frame 908 from the first point that has azimuth greater than the position in reference frame 908 that has the same scaled azimuth and laser ID as the previous decoded point (e.g., Prev Dec Point 902), to be used as the inter predictor point.

This technique adds an additional inter predictor point 912 that is obtained by finding the first point that has an azimuth greater than the inter predictor point (e.g., Inter Pred Point 910) as shown in FIG. 13. Additional signaling is used to indicate which of the predictors is selected if inter coding has been applied by G-PCC encoder 200. For example, G-PCC encoder 200 may signal to G-PCC decoder 300 which of the predictors is selected. The additional inter pred point may also be referred to as the "NextNext" inter predictor.

Improved Inter Prediction Flag Coding

In some examples, an improved context selection algorithm may be applied for coding the inter prediction flag. The inter prediction flag values of the five previously coded points may be used to select the context of the inter prediction flag in predictive geometry coding.

Global Motion Compensation

Figure 14:
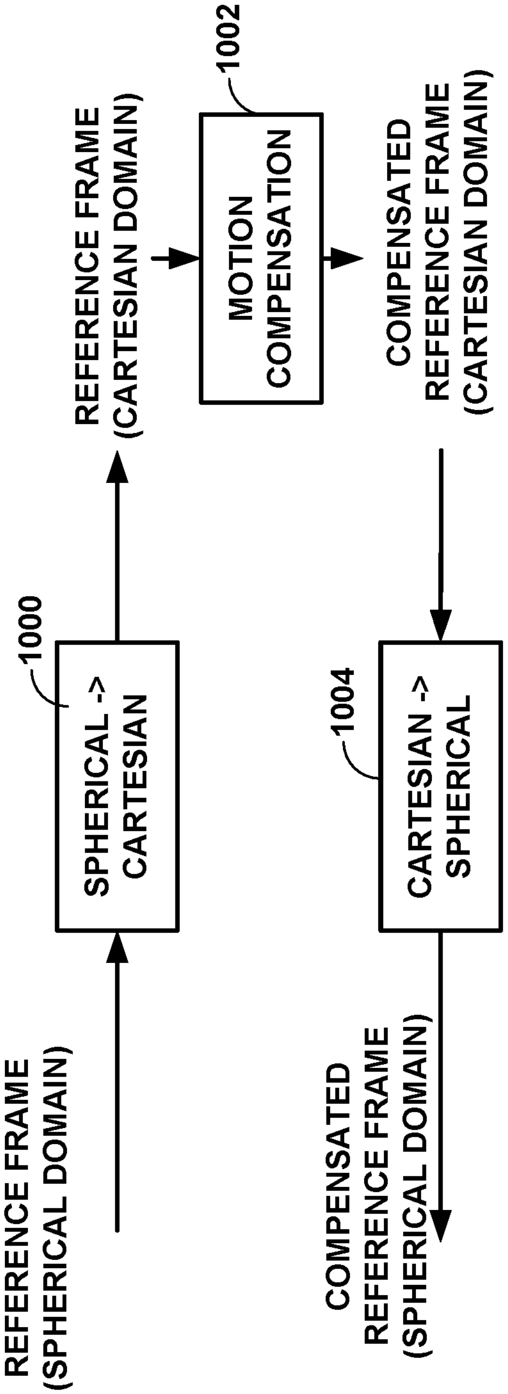
FIG. 14 is a flow diagram illustrating example motion compensation techniques.

FIG. 14 is a flow diagram illustrating example motion compensation techniques. When global motion (GM) parameters are available, inter prediction may be applied using a reference frame that is motion compensated using GM parameters. The GM parameters may include rotation parameters and/or translation parameters. Typically, the global motion compensation is applied in the Cartesian domain; in some cases, it may also be conducted in the spherical domain. Depending on which domain the reference frame is stored, and which domain the reference frame is compensated, one or more of Cartesian to Spherical domain conversion, or Spherical to Cartesian domain conversion may be applied. For example, G-PCC encoder 200 and G-PCC decoder 300 may apply coordinate domain conversion when applying motion compensation.

For example, as shown in FIG. 14, when the reference frame is stored in spherical domain, and the motion compensation is performed in the cartesian domain, G-PCC encoder 200 and G-PCC decoder 300 may first apply spherical→Cartesian translation 1000. Then, with the reference frame in the Cartesian domain, G-PCC encoder 200 and G-PCC decoder 300 may apply motion compensation 1002 to obtain a compensated reference frame in the Cartesian domain. G-PCC encoder 200 and G-PCC decoder 300 may then apply a Cartesian→spherical translation 1004 before outputting and/or storing the compensated reference frame in the spherical domain. In such cases, the compensated reference frame may be used for inter prediction.

Given a position (x,y,z) in cartesian coordinate system, G-PCC encoder 200 and G-PCC decoder 300 may calculate the corresponding radius and azimuthal (floating point implementation) as follows (As in CartesianToSpherical conversion function):

int64_t r0=int64_t(std::round(hypot(xyz[0], xyz[1])));

auto phi0=std::round((a tan2(xyz[1], xyz[0])/(2.0*M_PI)) *scalePhi);

where, scalePhi is modified for different rate points in the lossy configuration; a maximum value of 24 bits is used for azimuth angle when coding the geometry losslessly. The fixed-point implementation of the azimuth is available in convertXyZToRpl function.

Radius:

| | |
|---|---|
| Floating implementation | int64_t r0 = int64_t(std::round(hypot(xyz[0], xyz[1]))); |
| Fixed-point implementation (in convertXyzToRpl) | int64_t xLaser = xyz[0] << 8;<br>int64_t yLaser = xyz[1] << 8;<br>int64_t r0 = isqrt(xLaser * xLaser + yLaser * yLaser) >> 8; |

| | |
|---|---|
| Floating implementation | auto phi0 = std::round((atan2(xyz[1], xyz[0])/(2.0 * M_PI)) * scalePhi); |
| Fixed-point implementation (in convertXyzToRpl) | (*dst)[1] = (iatan2(yLaser, xLaser) + 3294199) >> 8; |

Vertical Prediction for G-PCC

In intra prediction for predictive geometry coding, one or more points that are coded are placed in a predictor list. For example, G-PCC encoder 200 and G-PCC decoder 300 generate a predictor list that includes one or more points. The prediction of radius and azimuth (and in some cases laser ID) values are performed. Typically, based on the order in which points are coded, the predictor points in the list are points that have the same laser ID as the currently coded point.

For spinning LIDAR systems with more than one laser, adjacent lasers are likely to capture points that belong to the same object. For regular objects (e.g., objects with continuous or near continuous surfaces), it is likely that the distance of the adjacent captured point (e.g., captured from an adjacent laser) of the same object is similar. This disclosure describes the following techniques for using information from adjacent lasers in predictive geometry coding. For example, the spherical coordinates or Cartesian coordinates of a point captured by an adjacent laser (e.g., a "vertical predictor") may be used in a predictive geometry coding process. Because such vertical predictors from adjacent lasers (e.g., points with a different laser ID) lead to better predictions than other points from the same laser ID, the techniques of this disclosure may lead to better coding efficiency.

As will be explained in more detail below, G-PCC encoder 200 and G-PCC decoder 300 may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry coding.

Predictor Laser ID List

For a current point, G-PCC encoder 200 and G-PCC decoder 300 may be configured to generate a predictor laser ID list which may be used to derive one or more vertical predictors to be used for prediction in predictive geometry coding. For example, G-PCC encoder 200 and G-PCC decoder 300 may be configured to determine a pivot laser ID L. This laser could represent the laser ID of the current point (e.g., if laser ID is already coded), or the pivot laser could be the laser ID of a previously coded point (e.g., the immediate previously decoded point).

G-PCC encoder 200 and G-PCC decoder 300 may be configured to generate the predictor laser ID list as follows: [L+1, L−1, L+2, L−2, . . . , L+N, L−N], where N is a fixed or signaled value indicative of the size of the predictor laser ID list. In other examples, non-symmetric lists around may be generated. That is, the term "pivot laser ID" does not require the generation of a predictor laser ID list that is symmetric about some pivot.

If there are $L_{max}$ laser IDs in the LIDAR system, the set of valid laser IDs is [0, $L_{max}$−1]. If any laser ID value in the laser ID list is outside the valid laser ID range, such laser ID may be removed or pruned from the predictor laser ID list. For example, G-PCC encoder 200 and G-PCC decoder 300 may remove any laser ID value outside of the valid laser ID range.

In addition, there may be another limit $N_{list}$ on the number of laser IDs in the predictive laser ID list. If the number of entries in the laser ID list is more than $N_{list}$, the size is reduced to $N_{list}$ by removing entries at the end of the predictive laser ID list. For example, G-PCC encoder 200 and G-PCC decoder 300 may remove entries at the end of the predictive laser ID list that exceed the value of $N_{list}$.

Accordingly, as part of determining the vertical predictor, G-PCC encoder 200 and G-PCC decoder 300 may determine a predictor laser ID list based on a pivot laser ID, wherein the predictor laser ID list includes a plurality of laser IDs. In some examples, the predictor laser ID list includes at least one laser ID above the pivot laser ID and at least one laser ID below the pivot laser ID. A laser ID that is above the pivot laser ID has an ID value greater than the pivot ID. A laser ID that is below the pivot laser ID has an ID value that is less than the pivot ID. In determining the predictor laser ID list, G-PCC encoder 200 and G-PCC decoder 300 may determine whether any laser IDs in the predictor laser ID list are outside a laser ID range, and remove any laser IDs in the predictor laser ID list that are outside the laser ID range.

Vertical Predictor

For each laser ID in the predictor laser ID list, G-PCC encoder 200 and G-PCC decoder 300 may be configured to derive a vertical predictor. In this context, a vertical predictor may be an adjacent or nearby laser relative to a current laser ID (or pivot laser ID) in the predictor laser ID list.

For a current point with laser ID L, and laser ID L1 (e.g., L+1) in the predictor laser ID list, G-PCC encoder 200 and G-PCC decoder 300 may be configured to derive a vertical predictor as follows. G-PCC encoder 200 and G-PCC decoder 300 determines a pivot azimuth value for the current point. In some cases, the pivot azimuth is the azimuth of the current point, or an estimate of the azimuth of the current point (e.g., if the current point is already coded). In some cases, the pivot azimuth is chosen as the azimuth (or an estimate of the azimuth) of a previously coded point. In one example, G-PCC encoder 200 and G-PCC decoder 300 may be configured to derive a first pivot azimuth index by scaling the pivot azimuth value. By scaling the pivot azimuth value, the first pivot azimuth index is effectively quantized to be within a range. As such, nearby azimuth values are more closely matched with each other. G-PCC encoder 200 may be configured to signal a vertical predictor azimuth scale value to G-PCC decoder 300, which is used to derive the first pivot azimuth index. The first pivot azimuth index is typically associated with the pivot laser ID.

G-PCC encoder 200 and G-PCC decoder 300 may derive a second azimuth index based on the value of first pivot azimuth index. In some cases, the second azimuth index is set equal to the first pivot azimuth index. The first pivot azimuth index is typically associated with the laser ID in the predictor laser ID list. G-PCC encoder 200 and G-PCC decoder 300 may derive a predictor azimuth index from the second azimuth index.

For example, if the pivot azimuth value corresponds to the azimuth of the current point, G-PCC encoder 200 and G-PCC decoder 300 are configured to set the predictor azimuth index equal to the second azimuth index. In one example, G-PCC encoder 200 and G-PCC decoder 300 set the predictor azimuth index equal to the smallest index value $azim_{sm}$ that is greater than or equal to the second azimuth index and for which there is a point associated with laser ID L1 and azimuth index $azim_{sm}$.

If the pivot azimuth value corresponds to the azimuth of the previously coded point, G-PCC encoder 200 and G-PCC decoder 300 set the predictor azimuth index equal to an index value that is greater than the second azimuth index. In one alternative example, G-PCC encoder 200 and G-PCC decoder 300 set the predictor azimuth index equal to the smallest index value $azim_{sm}$ that is greater than the second azimuth index and for which there is a point associated with laser ID L1 and azimuth index $azim_{sm}$. In another alternative example, G-PCC encoder 200 and G-PCC decoder 300 set the predictor azimuth index equal to the second smallest index value $azim_{ssm}$ that is greater than the second azimuth index and for which there is a point associated with laser ID L1 and azimuth index $azim_{ssm}$. In another alternative example, G-PCC encoder 200 and G-PCC decoder 300 set the predictor azimuth index equal to the largest index value $azim_{sm}$ that is smaller than the second azimuth index and for which there is a point associated with laser ID L1 and azimuth index $azim_{sm}$.

G-PCC encoder 200 and G-PCC decoder 300 may choose a previously coded point that has laser ID equal to L1 and has an azimuth index (e.g., a scaled azimuth value) equal to the predictor azimuth index. This point may be referred to as ($r_P$, $azim_P$, L1), and G-PCC encoder 200 and G-PCC decoder 300 may choose this point as the vertical predictor. The value $r_P$ is the radius of the vertical predictor, $azim_P$ is the azimuth of the vertical predictor, and L1 is the laser ID of the vertical predictor. If such point is not present, G-PCC encoder 200 and G-PCC decoder 300 does not choose a vertical predictor corresponding to the laser ID L1.

In other examples, G-PCC encoder 200 and G-PCC decoder 300 may be configured to derive a plurality of predictor indices for a predictor list laser ID L1. More generally, more than one predictor value (e.g., index) may be associated with the predictor list laser ID L1. G-PCC encoder 200 and G-PCC decoder 300 may derive the final predictor associated with L1 from the plurality of predictor values associated with the predictor list laser ID L1. For example, if there are two predictor values are associated with the predictor list laser ID L1, G-PCC encoder 200 and G-PCC decoder 300 may derive the final predictor associated with L1 using a weighted average or linear interpolation of the two predictor values.

Again, G-PCC encoder 200 and G-PCC decoder 300 may be configured to determine a pivot laser ID, determine a vertical predictor for a current point of the point cloud data, wherein the vertical predictor is based on a second point having a second laser ID different than the pivot laser ID, and code the current point using the vertical predictor and predictive geometry coding. In one example, the pivot laser ID is the laser ID of a previously decoded point. In another example, the pivot laser ID is the laser ID of the current point.

To determine the vertical predictor for the current point, G-PCC encoder 200 and G-PCC decoder 300 may be configured to determine a pivot azimuth value, scale the pivot azimuth value to obtain a first pivot azimuth index, determine a second azimuth index based on the first pivot azimuth index, and determining a predictor azimuth index based on the second azimuth index. G-PCC encoder 200 and G-PCC decoder 300 may then be configured to determine the vertical predictor based on the predictor azimuth index. To determine the pivot azimuth value, G-PCC encoder 200 and G-PCC decoder 300 may be configured to determine the pivot azimuth value from one of an azimuth of a previously decoded point, an azimuth of the current point, an estimate of an azimuth of the previously decoded point, or an estimate of an azimuth of the current point.

In order to scale the pivot azimuth value, G-PCC decoder 300 may be configured to receive a vertical predictor azimuth scale value (e.g., from G-PCC encoder 200), and scale the pivot azimuth value using the vertical predictor azimuth scale value to obtain the first pivot azimuth index.

In one example, to determine the vertical predictor based on the predictor azimuth index, G-PCC encoder 200 and G-PCC decoder 300 may be configured to determine the vertical predictor to be a previously coded point that has the second laser ID and an azimuth index equal to the predictor azimuth index.

In another example, the pivot azimuth value corresponds to an azimuth of a previously coded point. In this example, to determine the predictor azimuth index based on the second azimuth index, G-PCC encoder 200 and G-PCC decoder 300 may be configured to set the predictor azimuth index to equal to a smallest index value that is greater than a value of the second azimuth index for which there is a point that is associated with the second laser ID.

In order to decode the current point using the vertical predictor and predictive geometry decoding, G-PCC decoder 300 may be configured to decode residual coordinate values for the current point, determine coordinate values of the vertical predictor, and add the coordinate values of the vertical predictor to the residual coordinate values in order to obtained a reconstructed current point. In some examples, the residual coordinate values and the coordinate values of the vertical predictor are in a spherical domain. In this example, G-PCC decoder 300 may further convert the reconstructed current point from the spherical domain to a Cartesian domain.

In a reciprocal fashion to encode the current point using the vertical predictor and predictive geometry encoding, G-PCC encoder 200 may be configured to determine coordinate values of the current point, determine coordinate values of the vertical predictor, subtract the coordinate values of the vertical predictor from the coordinate values of the current point to obtain residual values for the current point, and encode the residual values. In one example, the coordinate values of the current point and the coordinate values of the vertical predictor are in a spherical domain. G-PCC encoder 200 may be further configured to convert the current point from a Cartesian domain to the spherical domain to obtain the coordinate values of the current point.

EXAMPLES

A few examples of the derivation of the vertical predictor are provided below. In Examples 1 and 2, G-PCC encoder 200 and G-PCC decoder 300 are configured to associate the pivot laser azimuth with the azimuth of the current point. In Examples 3 and 4, G-PCC encoder 200 and G-PCC decoder 300 are configured to associate the pivot laser azimuth with the azimuth of the previously coded point. The dotted lines in FIGS. 15-18 indicate the boundaries of azimuth index values, where points within two adjacent boundary lines have the same azimuth index (e.g., the quantized or scaled azimuth value). For example, in FIG. 15, current point (CP) 1100 and predictor (P) 1102 have the same azimuth index. G-PCC encoder 200 and G-PCC decoder 300 may implement the following examples.

Example 1

Figure 15:
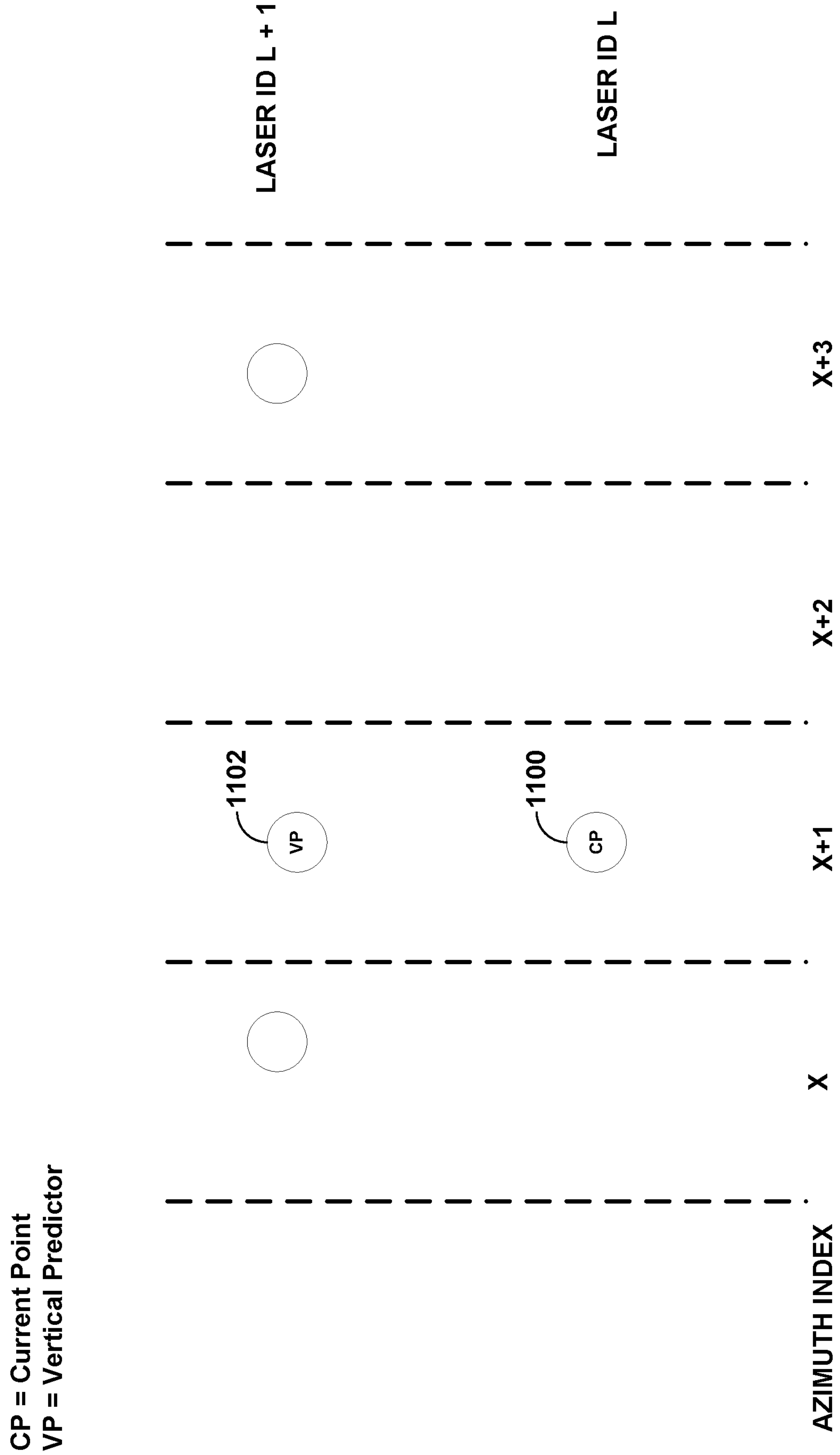
FIG. 15 is a conceptual diagram illustrating an example of derivation of a vertical predictor.

FIG. 15 is a conceptual diagram illustrating an example of derivation of a vertical predictor. In this example, the current point (CP) 1100 corresponds to laser ID L and the previous point has also laser ID L (not illustrated). G-PCC encoder 200 and G-PCC decoder 300 determines the vertical predictor laser ID value as L+1. The pivot azimuth value is associated with the azimuth of current point; the first azimuth index is x+1; the second azimuth index is also x+1, and the predictor azimuth index is also x+1. G-PCC encoder 200 and G-PCC decoder 300 determines point (VP) 1102, which has the azimuth index x+1, as the vertical predictor.

Example 2

Figure 16:
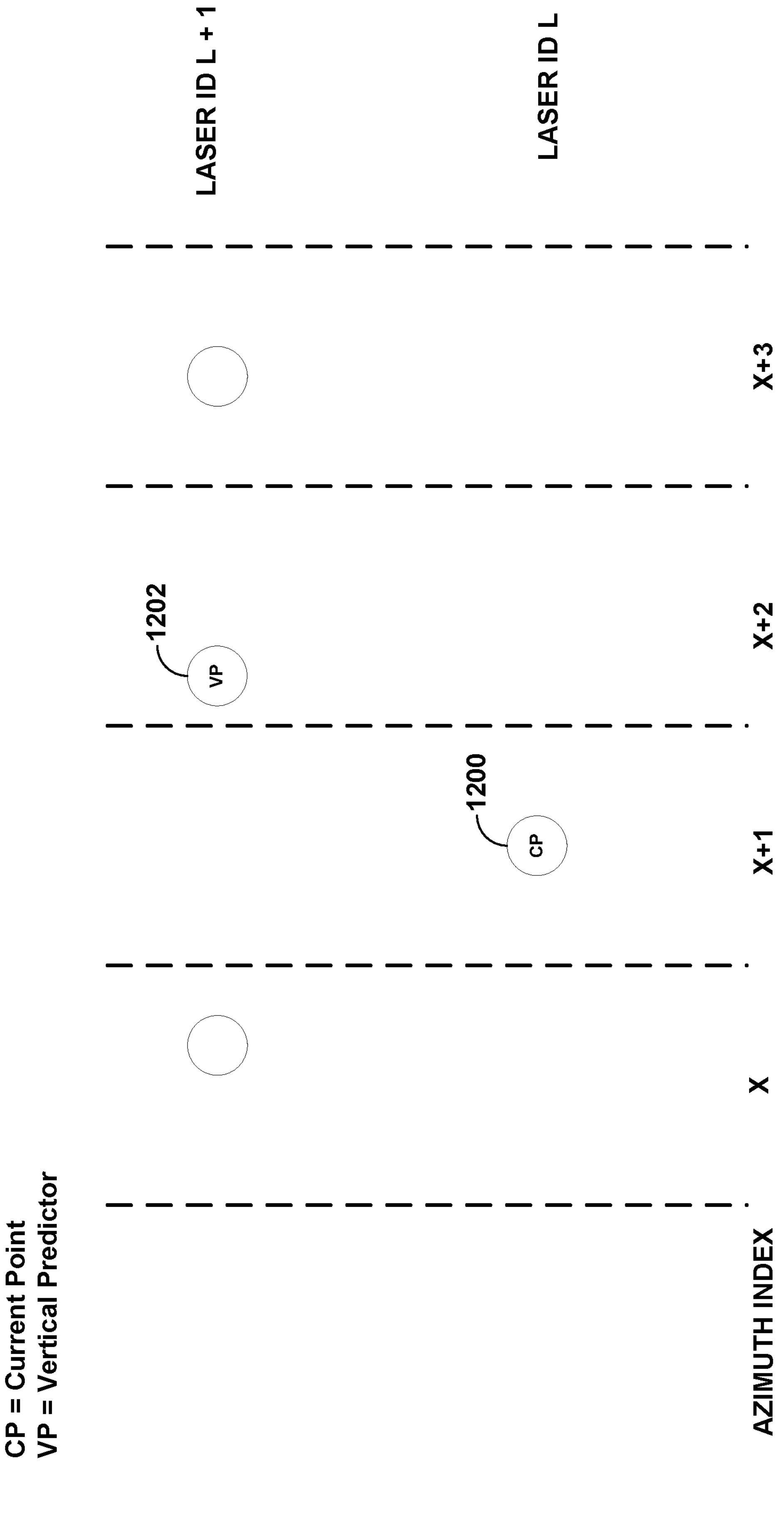
FIG. 16 is a conceptual diagram illustrating another example of derivation of a vertical predictor.

FIG. 16 is a conceptual diagram illustrating another example of derivation of a vertical predictor. In this example, the current point (CP) 1200 corresponds to laser ID L and the previous point also has laser ID L (not illustrated). G-PCC encoder 200 and G-PCC decoder 300 determines the vertical predictor laser ID value as L+1. The pivot azimuth value is associated with the azimuth of current point; the first azimuth index is x+1; the second azimuth index is also x+1, and the predictor azimuth index is x+2 (the smallest azimuth index that is greater than x+1 for which there is a point). G-PCC encoder 200 and G-PCC decoder 300 determines point (VP) 1202, which has the azimuth index x+2, as the vertical predictor.

Example 3

Figure 17:
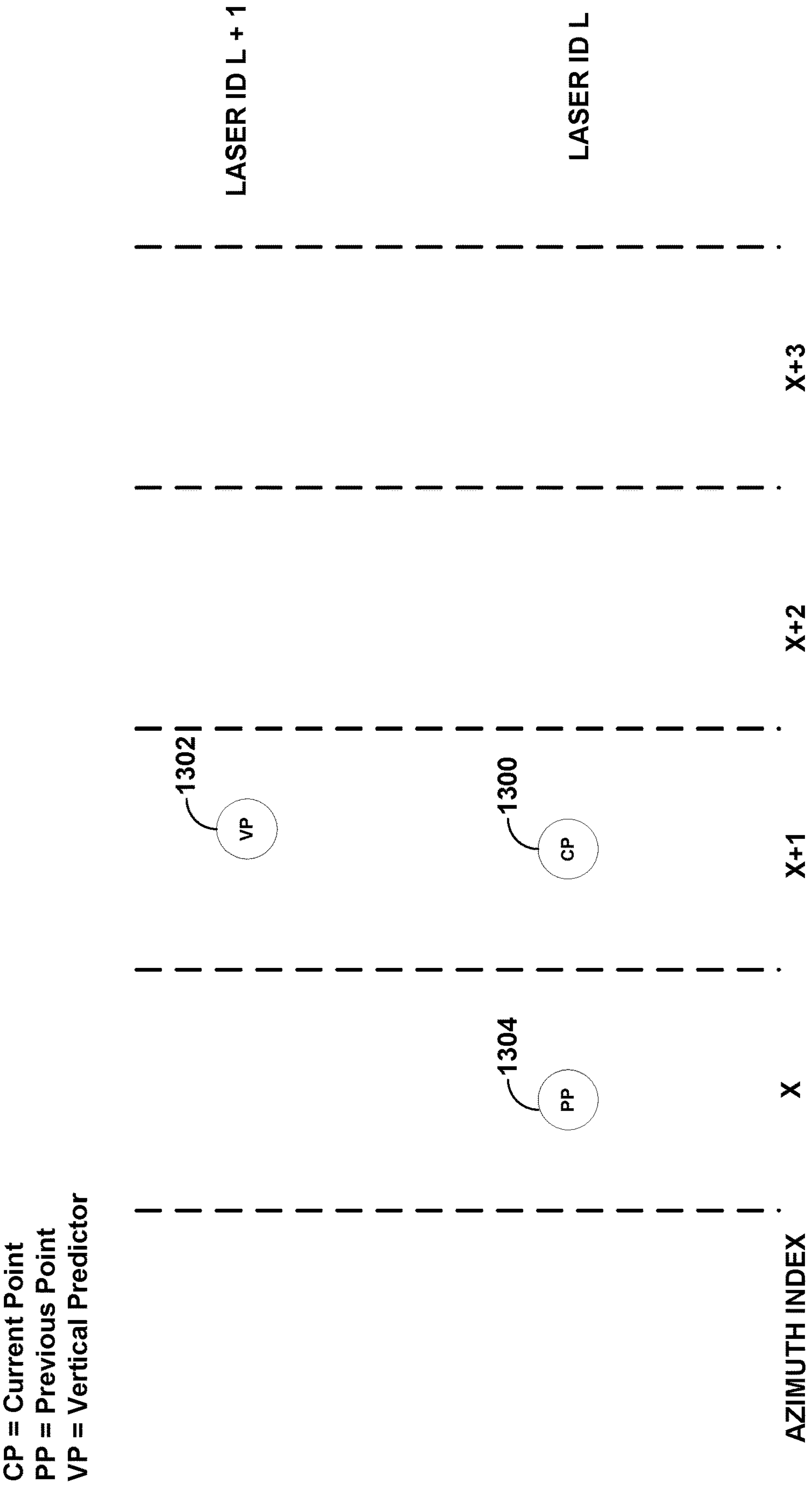
FIG. 17 is a conceptual diagram illustrating another example of derivation of a vertical predictor.

FIG. 17 is a conceptual diagram illustrating another example of derivation of a vertical predictor. In this example, the current point (CP) 1300 corresponds to laser ID L and the previous point (PP) 1304 also has laser ID L. G-PCC encoder 200 and G-PCC decoder 300 determines the vertical predictor laser ID value as L+1. The pivot azimuth value is associated with the azimuth of previous point (PP) 1304; the first azimuth index is x, the second azimuth index is also x, and the predictor azimuth index is x+1 (the smallest azimuth index that is greater than x for which there is a point). G-PCC encoder 200 and G-PCC decoder 300 determines point (VP) 1302, which has the azimuth index x+1, as the vertical predictor.

Example 4

Figure 18:
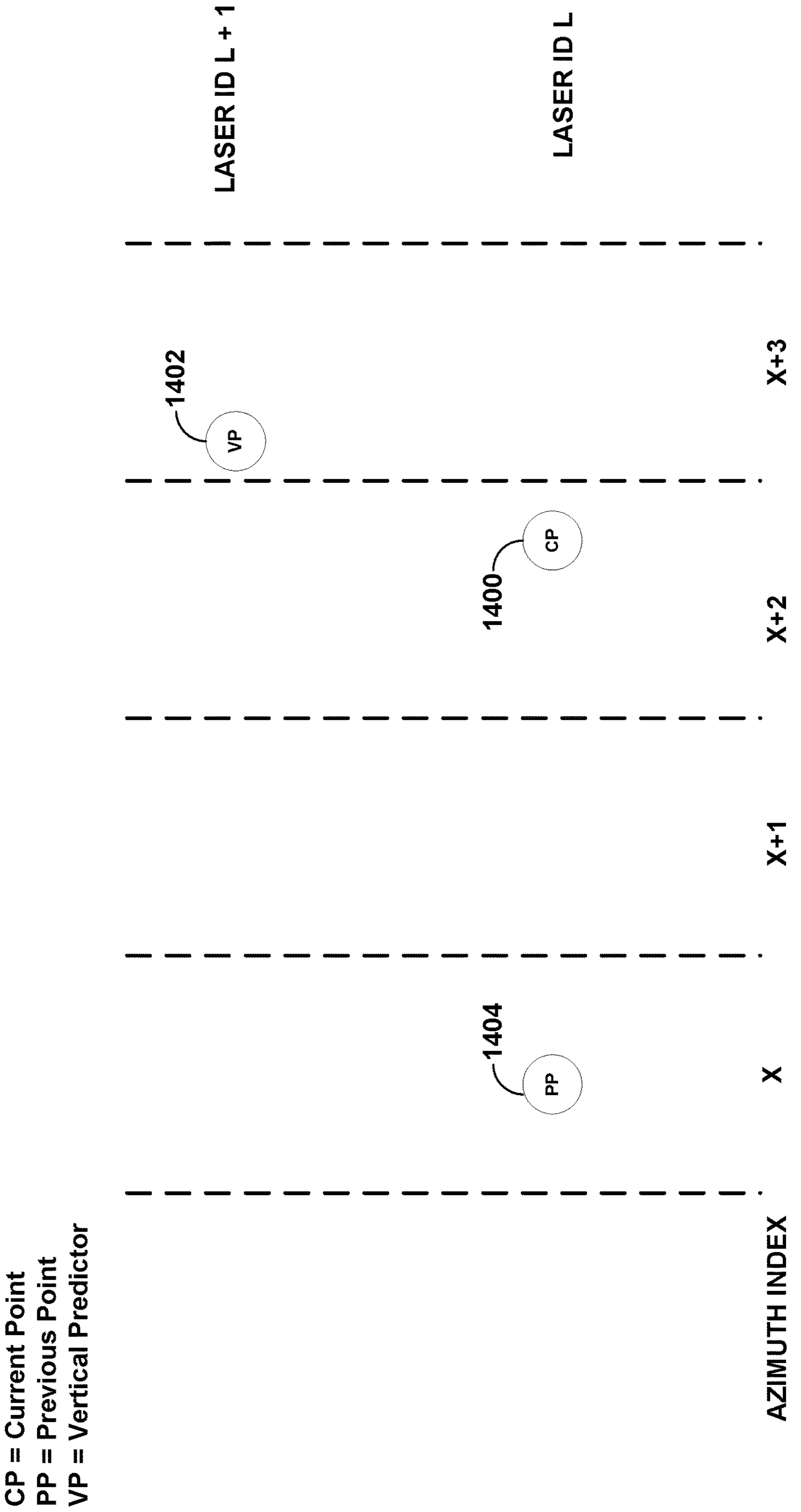
FIG. 18 is a conceptual diagram illustrating another example of derivation of a vertical predictor.

FIG. 18 is a conceptual diagram illustrating another example of derivation of a vertical predictor. In this example, the current point (CP) 1400 corresponds to laser ID L and the previous point (PP) 1404 also has laser ID L. G-PCC encoder 200 and G-PCC decoder 300 determines the vertical predictor laser ID value as L+1. The pivot azimuth value is associated with the azimuth of previous point (PP) 1404; the first azimuth index is x, the second azimuth index is also x, and the predictor azimuth index is x+3 (the smallest azimuth index that is greater than x for which there is a point). G-PCC encoder 200 and G-PCC decoder 300 determines point (VP) 1402, which has the azimuth index x+3, as the vertical predictor.

Vertical Predictor Azimuth Scale Vector

In some examples, G-PCC encoder 200 and G-PCC decoder 300 uses a vertical predictor azimuth scale value to derive the azimuth index from an azimuth value. For example, G-PCC encoder 200 and G-PCC decoder 300 may derive the azimuth index by dividing the azimuth value with the scale value after adding an offset to the azimuth value.

The azimuth index may also be represented as a quantized version of the azimuth value based on the azimuth scale value. For example, G-PCC encoder 200 and G-PCC decoder 300 may determine the azimuth index by quantizing the azimuth value with an azimuth scale value and then multiplying by the azimuth scale value to bring the azimuths to the same scale level. If the azimuth values are quantized by different scale values, the azimuth values across laser IDs may not be comparable. Therefore, multiplication by the respective scale value may bring the azimuth values back to the same scale space and then the azimuth indices may be compared across laser IDs. Based on the scale values, the azimuth index of one laser ID may be at a coarser or finer representation than that of another laser ID.

In some examples, the vertical predictor azimuth scale value may be the same for all laser ID values. In one example, where all the laser IDs have a similar sampling frequency of points, the same azimuth scale value may be sufficient for the laser IDs.

In some examples, the vertical predictor azimuth scale value may be different for different laser ID values. In some examples, the sampling frequency of different laser IDs may be different. In such cases, a different scaling value may apply for different laser IDs. For example, if the sampling frequency of laser ID x is K1 and the sampling frequency of laser ID y is K2, then the azimuth scale value of points of Laser ID x may be s/K1 whereas the azimuth scale value of points of Laser ID y may be s/K2, where s is a constant value. Depending on whether the scale values are multiplied or divided, the scale values may also be s*K1 and s*K2.

In some examples, G-PCC encoder 200 and G-PCC decoder 300 may derive the vertical predictor scale value based on the sampling frequency or the numbers of points associated with the laser ID in a frame.

In one example, the azimuth scale value may be different for the points in the pivot laser ID and for points in the predictor laser ID. For example, for pivot laser ID L, the azimuth scale value may be s1. As the predictor laser ID value increases, the points become farther and farther from the pivot laser ID. In such cases, farther laser IDs may be given different scale value such that farther laser IDs have coarser representation of azimuth than closer laser IDs.

Scale values may be positive numbers, and in some cases, represented as powers of 2 (e.g., $2^n$ or $1/(2^n)$).

Lookup Table

G-PCC encoder 200 and G-PCC decoder 300 may generate a lookup table for the current frame as it is being coded. The lookup table has an index as a 2-tuple—laser ID and azimuth index—and for each entry, one or more of the following coordinates of a point may be chosen: radius, azimuth. In cases where there is more than one point associated with a lookup table entry, each point may be stored in a list associated with the lookup table entry (e.g., the lookup table entry is effectively a list). G-PCC encoder 200 and G-PCC decoder 300 may update the lookup table as each point is coded in the current frame. The lookup table may be used to search for points with a particular azimuth index and laser ID value.

Vertical Predictor Mode

G-PCC encoder 200 and G-PCC decoder 300 may be configured to code a point cloud in accordance with a maximum number of vertical predictors specified as $N_{max}$. When the value of $N_{max}$ is greater than 1 (more than one vertical predictor may be used for prediction), G-PCC encoder 200 may signal a syntax element to G-PCC decoder 300 to specify which vertical predictor is used for prediction.

Indication of Vertical Predictor

G-PCC encoder 200 may signal a flag to G-PCC decoder 300 to indicate that a vertical predictor is used. In another example, PCC encoder 200 and G-PCC decoder 300 may be configured to add the vertical predictor to the predictor list of prediction candidates. Context selection for the vertical predictor flag may be performed as follows: a single context may be used to code the vertical predictor flag; or two contexts may be used to code the vertical predictor flag with the context selected based on whether the previously coded point is predicted using vertical prediction.

Indication of Vertical Prediction Mode

When more than one vertical predictor is present for a current point, G-PCC encoder 200 may signal a mode value to G-PCC decoder 300 to indicate which predictor is used for prediction. The mode value may be an index to the predictor list indicating the vertical predictor to be used.

Example Implementation

The following example describes the use of one vertical predictor in the intra prediction mechanism. G-PCC encoder 200 and G-PCC decoder 300 may derive the vertical predictor from adjacent laser IDs as described above. G-PCC encoder 200 may signal a flag to G-PCC decoder 300 to indicate that vertical predictor is used.

G-PCC encoder 200 and G-PCC decoder 300 may determine the pivot laser ID as the laser ID L of the previously coded point. G-PCC encoder 200 and G-PCC decoder 300 may determine the laser ID list as [L+1, L−1]. In this example, only one vertical predictor is used for any point. Therefore: if the vertical predictor corresponding to laser ID entry L+1 is present, that is used as the vertical predictor; if vertical predictor corresponding to laser ID entry L−1 is present, that is used as the vertical predictor; else (e.g., vertical predictors corresponding to laser ID entry L+1 and L−1 are absent), no vertical predictor is available for the current point.

G-PCC encoder 200 and G-PCC decoder 300 may determine the pivot azimuth value as the azimuth of the previously coded point. G-PCC encoder 200 signals a vertical predictor azimuth scale value in the bitstream. G-PCC decoder 300 uses the vertical predictor azimuth scale value to derive the first pivot azimuth index. The second azimuth index is chosen to be the same as the first pivot index. The predictor index is chosen as the smallest azimuth index $azimIdx_{sm}$ that is greater than the second azimuth index such that there a previously coded point that has laser ID equal to the vertical predictor laser ID list entry and has a scaled azimuth equal to $azimidx_{sm}$.

Figure 19:
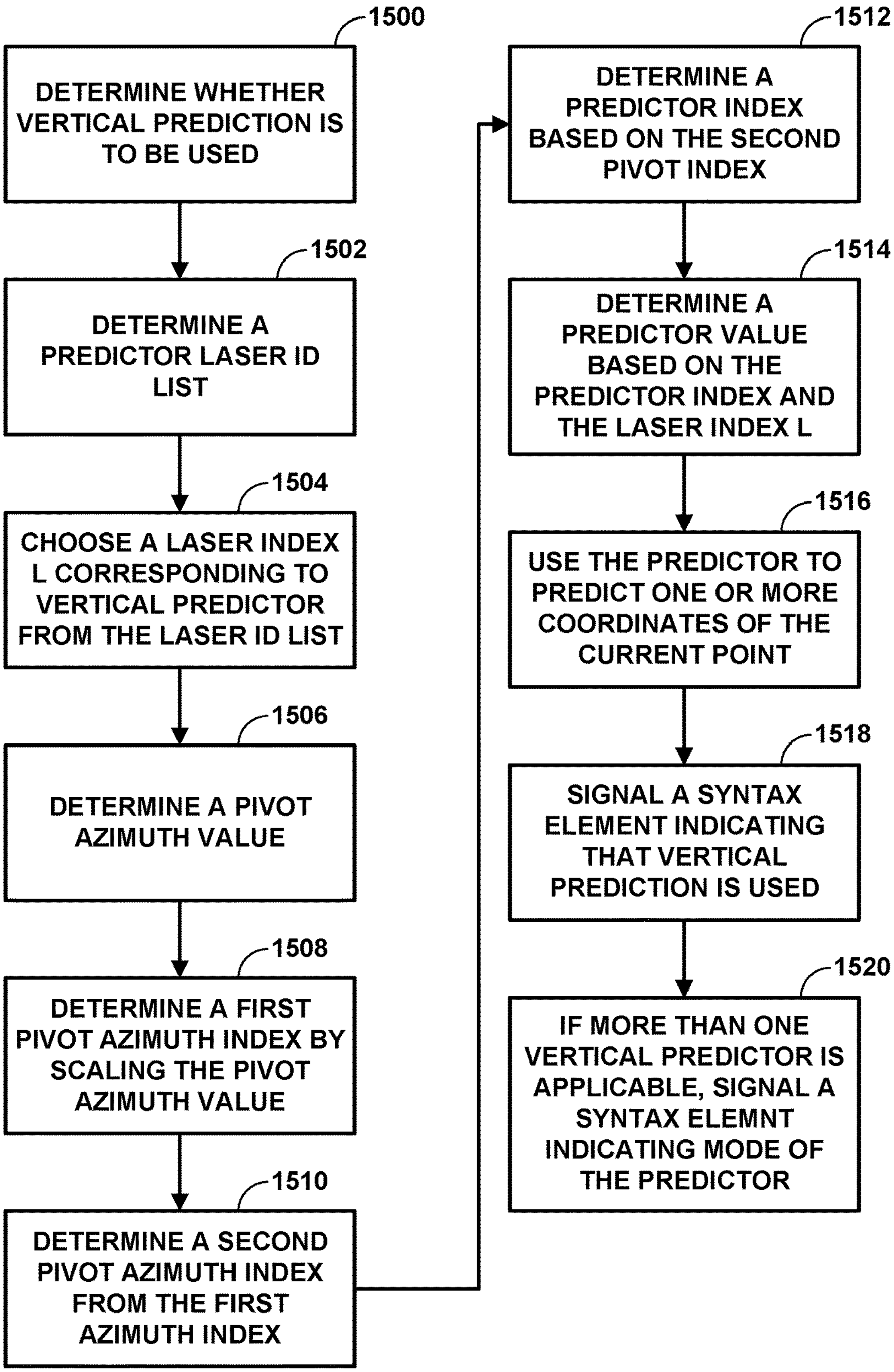
FIG. 19 is a flow diagram illustrating one example encoding technique of the disclosure.

FIG. 19 is a flow diagram illustrating example encoding techniques. The techniques of FIG. 19 may be performed by G-PCC encoder 200, including prediction tree construction unit 207 and vertical predictor unit 209 of FIG. 5.

In one example of the disclosure, G-PCC encoder 200 may first determine whether vertical prediction is to be used (1500). If yes, G-PCC encoder 200 may determine a predictor laser ID list using combination of techniques described above (1502). G-PCC encoder 200 may then choose laser index L corresponding to the vertical predictor from the laser ID list. G-PCC encoder 200 may then determine a pivot azimuth value (1506).

Next, G-PCC encoder 200 may determine a first pivot azimuth index by scaling the pivot azimuth value (1508). G-PCC encoder 200 then determines a second pivot azimuth index from the first azimuth index (1510). G-PCC encoder 200 may then determine a predictor index based on the second pivot index (1512).

G-PCC encoder 200 may then determine a predictor value (e.g., the vertical predictor) based on the predictor index and the laser index L (1514). G-PCC encoder 200 may then use the predictor (e.g., the vertical predictor) to predictor one or more coordinates of the current point (1516). G-PCC encoder 200 may signal a syntax element to G-PCC decoder 300 indicating that vertical prediction is used (1518). If more than one vertical predictor is applicable, G-PCC encoder 200 may further signal another syntax element indicating the mode of the predictor.

Figure 20:
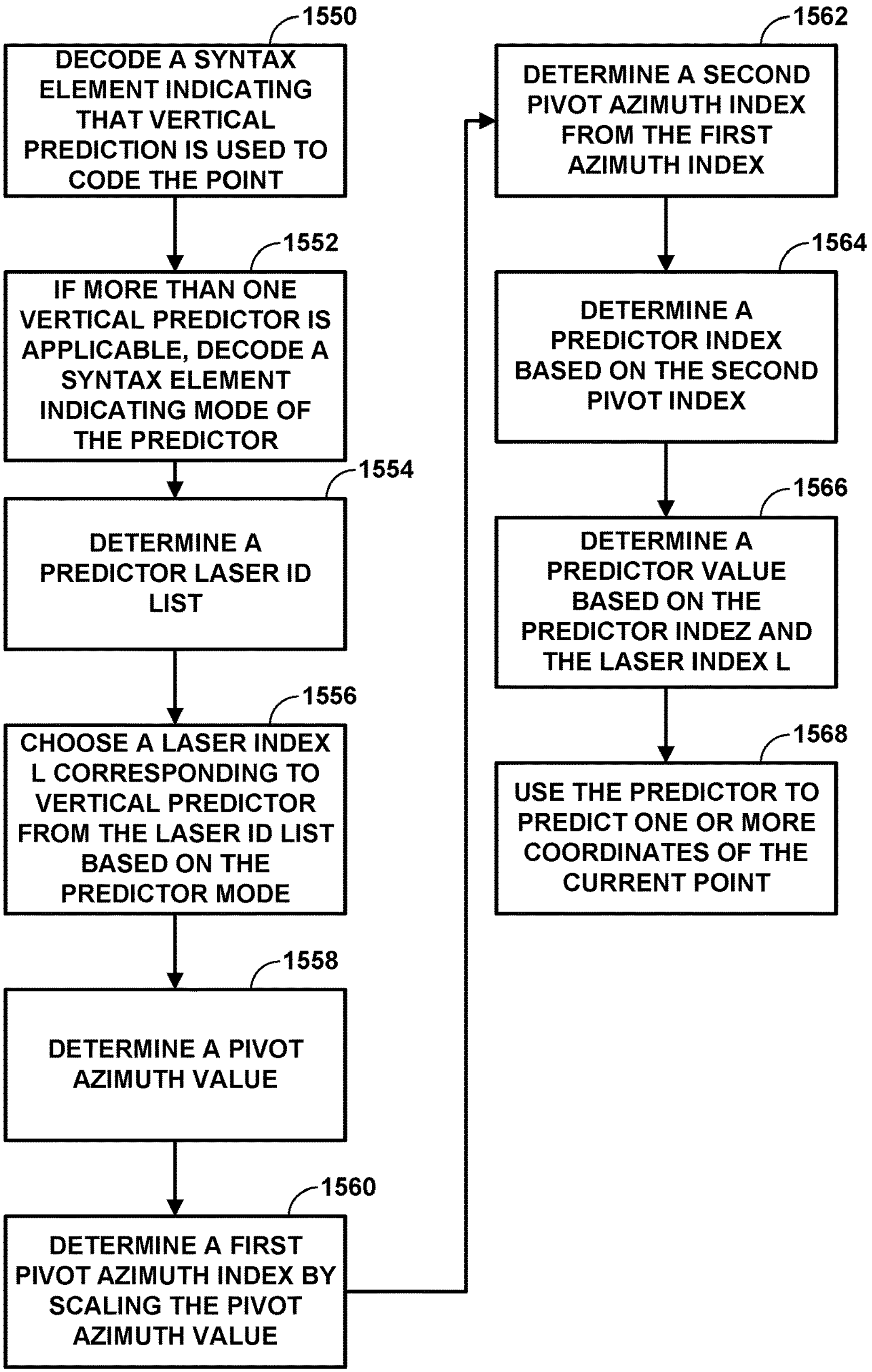
FIG. 20 is a flow diagram illustrating one example decoding technique of the disclosure.

FIG. 20 is a flow diagram illustrating example decoding techniques. The techniques of FIG. 20 may be performed by G-PCC decoder 300, including prediction tree synthesis unit 307 and vertical predictor unit 309 of FIG. 7.

G-PCC decoder 300 may decode a syntax element indicating that vertical prediction is used to code the current point (1550). If more than one vertical predictor is applicable, G-PCC decoder 300 may further decode another syntax element indicating the mode of the predictor.

G-PCC decoder 300 may then determine a predictor laser ID list using combination of techniques described above (1554). G-PCC decoder 300 may then choose laser index L corresponding to the vertical predictor from the laser ID list based on the predictor mode (1556). G-PCC decoder 300 may then determine a pivot azimuth value (1558).

Next, G-PCC decoder 300 may determine a first pivot azimuth index by scaling the pivot azimuth value (1560). G-PCC decoder 300 then determines a second pivot azimuth index from the first azimuth index (1562). G-PCC decoder 300 may then determine a predictor index based on the second pivot index (1564).

G-PCC decoder 300 may then determine a predictor value (e.g., the vertical predictor) based on the predictor index and the laser index L (1566). G-PCC decoder 300 may then use the predictor (e.g., the vertical predictor) to predictor one or more coordinates of the current point (1568).

Figure 21:
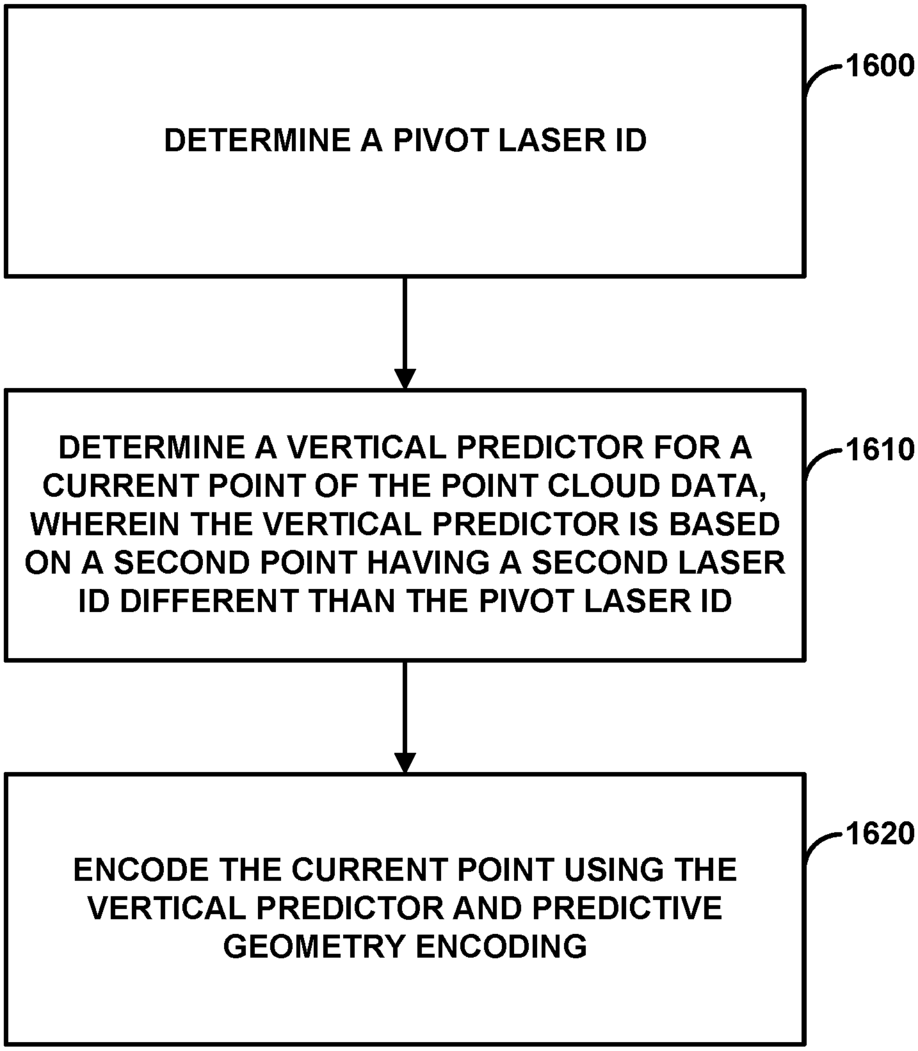
FIG. 21 is a flow diagram illustrating another example encoding technique of the disclosure.

FIG. 21 is a flow diagram illustrating another example encoding technique of the disclosure. The techniques of FIG. 21 may be performed by G-PCC encoder 200 including prediction tree construction unit 207 and vertical predictor unit 209.

In accordance with the techniques described above, G-PCC encoder 200 may be configured to determine a pivot laser ID (1600), determine a vertical predictor for a current point of the point cloud data, wherein the vertical predictor is based on a second point having a second laser ID different than the pivot laser ID (1610), and encode the current point using the vertical predictor and predictive geometry encoding (1620).

To determine the pivot laser ID, G-PCC encoder 200 may be configured to determine the pivot laser ID to be a laser ID of a previously encoded point. In another example, G-PCC encoder 200 may be configured to determine the pivot laser ID to be a laser ID of the current point.

In another example, G-PCC encoder 200 may be configured to determine a predictor laser ID list based on the pivot laser ID, wherein the predictor laser ID list includes a plurality of laser IDs, including the second laser ID. In one example, the predictor laser ID list includes at least one laser ID above the pivot laser ID and at least one laser ID below the pivot laser ID.

In another example, to determine the vertical predictor, G-PCC encoder 200 may be configured to determine a respective vertical predictor for each of the plurality of laser IDs in the predictor laser ID list, determine the vertical predictor to be a first respective vertical predictor associated with the laser ID directly above the pivot laser ID, or determine, based on the first respective vertical predictor being unavailable, the vertical predictor to be a second respective vertical predictor associated with the laser ID directly below the pivot laser ID, or determine, based on the first respective vertical predictor being unavailable and the second respective vertical predictor being unavailable, that no vertical predictor is available.

To determine the predictor laser ID list, G-PCC encoder 200 may be configured to determine whether any laser IDs in the predictor laser ID list are outside a laser ID range, and remove any laser IDs from the predictor laser ID list that are outside the laser ID range. In another example, to determine the vertical predictor for the current point, G-PCC encoder 200 may be configured to determine a pivot azimuth value, scale the pivot azimuth value to obtain a first pivot azimuth index, determine a second azimuth index based on the first pivot azimuth index, determine a predictor azimuth index based on the second azimuth index, and determine the vertical predictor based on the predictor azimuth index.

In one example, to determine the pivot azimuth value, G-PCC encoder 200 may be configured to determine the pivot azimuth value from one of an azimuth of a previously encoded point, an azimuth of the current point, an estimate of an azimuth of the previously encoded point, or an estimate of an azimuth of the current point.

In one example, to scale the pivot azimuth value, G-PCC encoder 200 may be configured to scale the pivot azimuth value using an vertical predictor azimuth scale value to obtain the first pivot azimuth index, and encode a syntax element indicating the vertical predictor azimuth scale value.

In another example, to determine the vertical predictor based on the predictor azimuth index, G-PCC encoder 200 may be configured to determine the vertical predictor to be a previously coded point that has the second laser ID and an azimuth index equal to the predictor azimuth index.

In another example, the pivot azimuth value corresponds to an azimuth of a previously coded point. In this example, to determine the predictor azimuth index based on the second azimuth index, G-PCC encoder 200 may be configured to set the predictor azimuth index to equal to a smallest index value that is greater than a value of the second azimuth index for which there is a point that is associated with the second laser ID.

In order to encode the current point using the vertical predictor and predictive geometry encoding, G-PCC encoder 200 may be configured to determine coordinate values of the current point, wherein the coordinate values of the current point are in a spherical domain and include a radius, determine coordinate values of the vertical predictor, wherein the coordinate values of the vertical predictor are in the spherical domain and include a vertical predictor radius, subtract the coordinate values of the vertical predictor from the coordinate values of the current point to obtain residual values for the current point, wherein to subtract the coordinate values of the vertical predictor from the coordinate values of the current point, the one or more processors are further configured to cause the apparatus to subtract the vertical predictor radius from the radius, and encode the residual values. G-PCC encoder 200 may be further configured to convert the current point from a Cartesian domain to the spherical domain to obtain the coordinate values of the current point.

Figure 22:
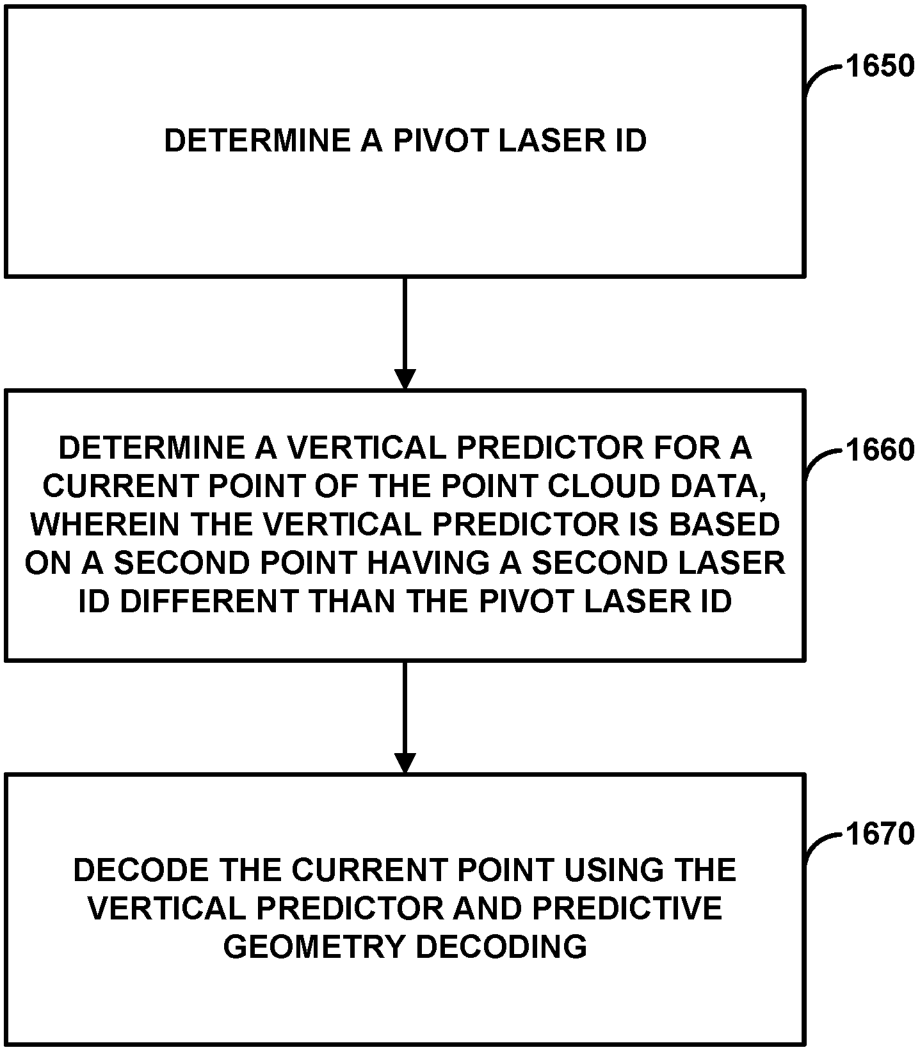
FIG. 22 is a flow diagram illustrating another example decoding technique of the disclosure.

FIG. 22 is a flow diagram illustrating another example decoding technique of the disclosure. The techniques of FIG. 21 may be performed by G-PCC decoder 300 including prediction tree synthesis unit 307 and vertical predictor unit 309.

In accordance with the techniques described above, G-PCC decoder 300 may be configured to determine a pivot laser ID (1650), determine a vertical predictor for a current point of the point cloud data, wherein the vertical predictor is based on a second point having a second laser ID different than the pivot laser ID (1660), and decode the current point using the vertical predictor and predictive geometry decoding (1670).

To determine the pivot laser ID, G-PCC decoder 300 may be configured to determine the pivot laser ID to be a laser ID of a previously decoded point. In another example, G-PCC decoder 300 may be configured to determine the pivot laser ID to be a laser ID of the current point.

In another example, G-PCC decoder 300 may be configured to determine a predictor laser ID list based on the pivot laser ID, wherein the predictor laser ID list includes a plurality of laser IDs, including the second laser ID. In one example, the predictor laser ID list includes at least one laser ID above the pivot laser ID and at least one laser ID below the pivot laser ID.

In another example, to determine the vertical predictor, G-PCC decoder 300 may be configured to determine a respective vertical predictor for each of the plurality of laser IDs in the predictor laser ID list, determine the vertical predictor to be a first respective vertical predictor associated with the laser ID directly above the pivot laser ID, or determine, based on the first respective vertical predictor being unavailable, the vertical predictor to be a second respective vertical predictor associated with the laser ID directly below the pivot laser ID, or determine, based on the first respective vertical predictor being unavailable and the second respective vertical predictor being unavailable, that no vertical predictor is available.

To determine the predictor laser ID list, G-PCC decoder 300 may be configured to determine whether any laser IDs in the predictor laser ID list are outside a laser ID range, and remove any laser IDs from the predictor laser ID list that are outside the laser ID range. In another example, to determine the vertical predictor for the current point, G-PCC decoder 300 may be configured to determine a pivot azimuth value, scale the pivot azimuth value to obtain a first pivot azimuth index, determine a second azimuth index based on the first pivot azimuth index, determine a predictor azimuth index based on the second azimuth index, and determine the vertical predictor based on the predictor azimuth index.

In one example, to determine the pivot azimuth value, G-PCC decoder 300 may be configured to determine the pivot azimuth value from one of an azimuth of a previously decoded point, an azimuth of the current point, an estimate of an azimuth of the previously decoded point, or an estimate of an azimuth of the current point.

In one example, to scale the pivot azimuth value, G-PCC decoder 300 may be configured to receive a vertical predictor azimuth scale value, and scale the pivot azimuth value using the vertical predictor azimuth scale value to obtain the first pivot azimuth index.

In another example, to determine the vertical predictor based on the predictor azimuth index, G-PCC decoder 300 may be configured to determine the vertical predictor to be a previously coded point that has the second laser ID and an azimuth index equal to the predictor azimuth index.

In another example, the pivot azimuth value corresponds to an azimuth of a previously coded point. In this example, to determine the predictor azimuth index based on the second azimuth index, G-PCC decoder 300 may be configured to set the predictor azimuth index to equal to a smallest index value that is greater than a value of the second azimuth index for which there is a point that is associated with the second laser ID.

In another example, to decode the current point using the vertical predictor and predictive geometry decoding, G-PCC decoder 300 is configured to decode residual coordinate values for the current point, wherein the residual coordinate values are in a spherical domain and include a residual radius, determine coordinate values of the vertical predictor, wherein the coordinate values of the vertical predictor are in the spherical domain and include a vertical predictor radius, and add the coordinate values of the vertical predictor to the residual coordinate values in order to obtained a reconstructed current point, wherein to add the coordinate values of the vertical predictor to the residual coordinate values, the one or more processors are further configured to cause the apparatus to add the residual radius to the vertical predictor radius. G-PCC decoder 300 may be further configured to convert the reconstructed current point from the spherical domain to a Cartesian domain.

Figure 23:
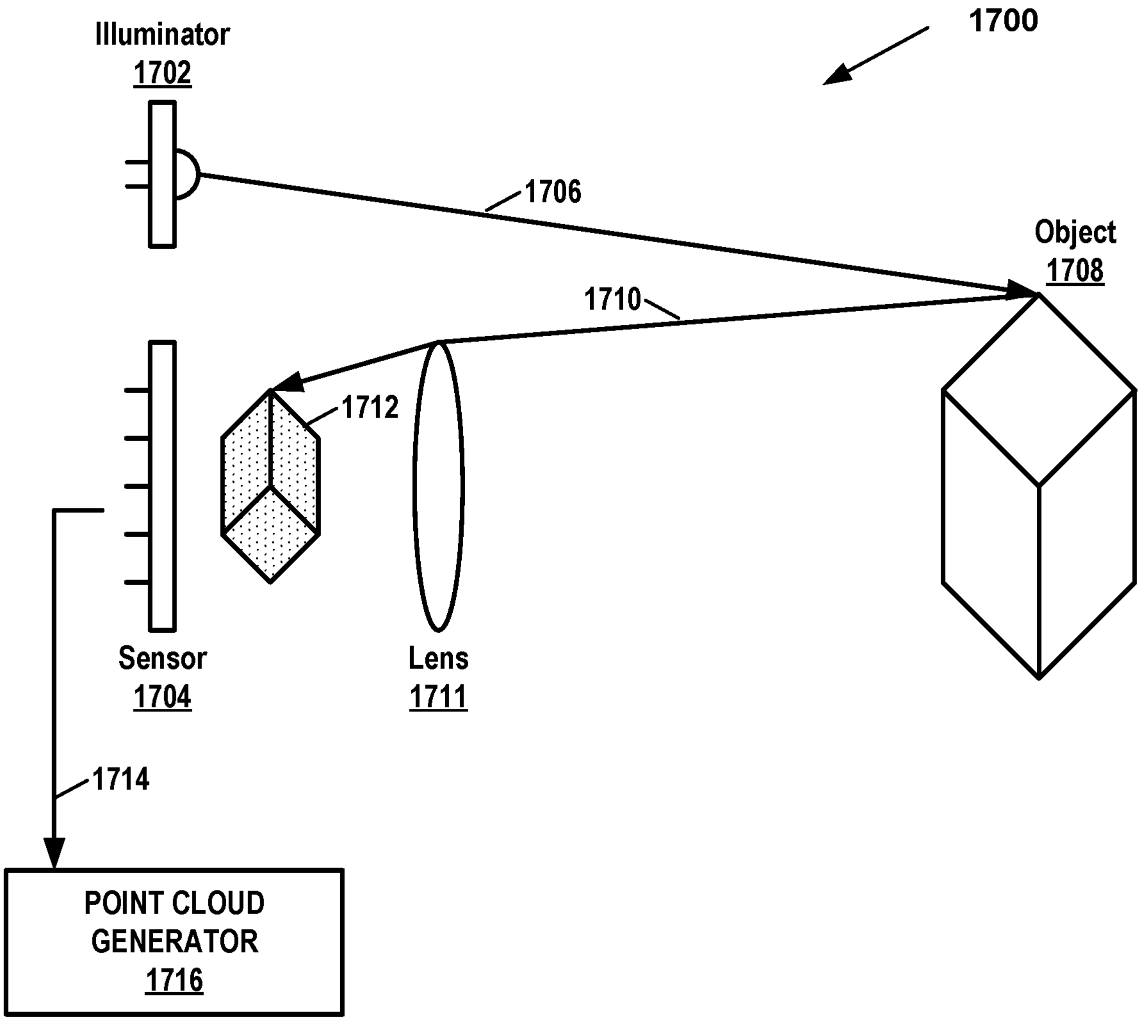
FIG. 23 is a conceptual diagram illustrating an example range-finding system that may be used with one or more techniques of this disclosure.

FIG. 23 is a conceptual diagram illustrating an example range-finding system 1700 that may be used with one or more techniques of this disclosure for coding point cloud data using predictive geometry coding and a vertical predictor. In the example of FIG. 23, range-finding system 1700 includes an illuminator 1702 and a sensor 1704. Illuminator 1702 may emit light 1706. In some examples, illuminator 1702 may emit light 1706 as one or more laser beams. Light 1706 may be in one or more wavelengths, such as an infrared wavelength or a visible light wavelength. In other examples, light 1706 is not coherent, laser light. When light 1706 encounters an object, such as object 1708, light 1706 creates returning light 1710. Returning light 1710 may include backscattered and/or reflected light. Returning light 1710 may pass through a lens 1711 that directs returning light 1710 to create an image 1712 of object 1708 on sensor 1704. Sensor 1704 generates signals 1714 based on image 1712. Image 1712 may comprise a set of points (e.g., as represented by dots in image 1712 of FIG. 23).

In some examples, illuminator 1702 and sensor 1704 may be mounted on a spinning structure so that illuminator 1702 and sensor 1704 capture a 360-degree view of an environment (e.g., a spinning LIDAR sensor). In other examples, range-finding system 1700 may include one or more optical components (e.g., mirrors, collimators, diffraction gratings, etc.) that enable illuminator 1702 and sensor 1704 to detect ranges of objects within a specific range (e.g., up to 360-degrees). Although the example of FIG. 23 only shows a single illuminator 1702 and sensor 1704, range-finding system 1700 may include multiple sets of illuminators and sensors.

In some examples, illuminator 1702 generates a structured light pattern. In such examples, range-finding system 1700 may include multiple sensors 1704 upon which respective images of the structured light pattern are formed. Range-finding system 1700 may use disparities between the images of the structured light pattern to determine a distance to an object 1708 from which the structured light pattern backscatters. Structured light-based range-finding systems may have a high level of accuracy (e.g., accuracy in the sub-millimeter range), when object 1708 is relatively close to sensor 1704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1700 is a time of flight (ToF)-based system. In some examples where range-finding system 1700 is a ToF-based system, illuminator 1702 generates pulses of light. In other words, illuminator 1702 may modulate the amplitude of emitted light 1706. In such examples, sensor 1704 detects returning light 1710 from the pulses of light 1706 generated by illuminator 1702. Range-finding system 1700 may then determine a distance to object 1708 from which light 1706 backscatters based on a delay between when light 1706 was emitted and detected and the known speed of light in air). In some examples, rather than (or in addition to) modulating the amplitude of the emitted light 1706, illuminator 1702 may modulate the phase of the emitted light 1706. In such examples, sensor 1704 may detect the phase of returning light 1710 from object 1708 and determine distances to points on object 1708 using the speed of light and based on time differences between when illuminator 1702 generated light 1706 at a specific phase and when sensor 1704 detected returning light 1710 at the specific phase.

In other examples, a point cloud may be generated without using illuminator 1702. For instance, in some examples, sensors 1704 of range-finding system 1700 may include two or more optical cameras. In such examples, range-finding system 1700 may use the optical cameras to capture stereo images of the environment, including object 1708. Range-finding system 1700 may include a point cloud generator 1716 that may calculate the disparities between locations in the stereo images. Range-finding system 1700 may then use the disparities to determine distances to the locations shown in the stereo images. From these distances, point cloud generator 1716 may generate a point cloud.

Sensors 1704 may also detect other attributes of object 1708, such as color and reflectance information. In the example of FIG. 23, a point cloud generator 1716 may generate a point cloud based on signals 1714 generated by sensor 1704. Range-finding system 1700 and/or point cloud generator 1716 may form part of data source 104 (FIG. 1). Hence, a point cloud generated by range-finding system 1700 may be encoded and/or decoded according to any of the techniques of this disclosure. Inter prediction and residual prediction, as described in this disclosure may reduce the size of the encoded data.

Figure 24:
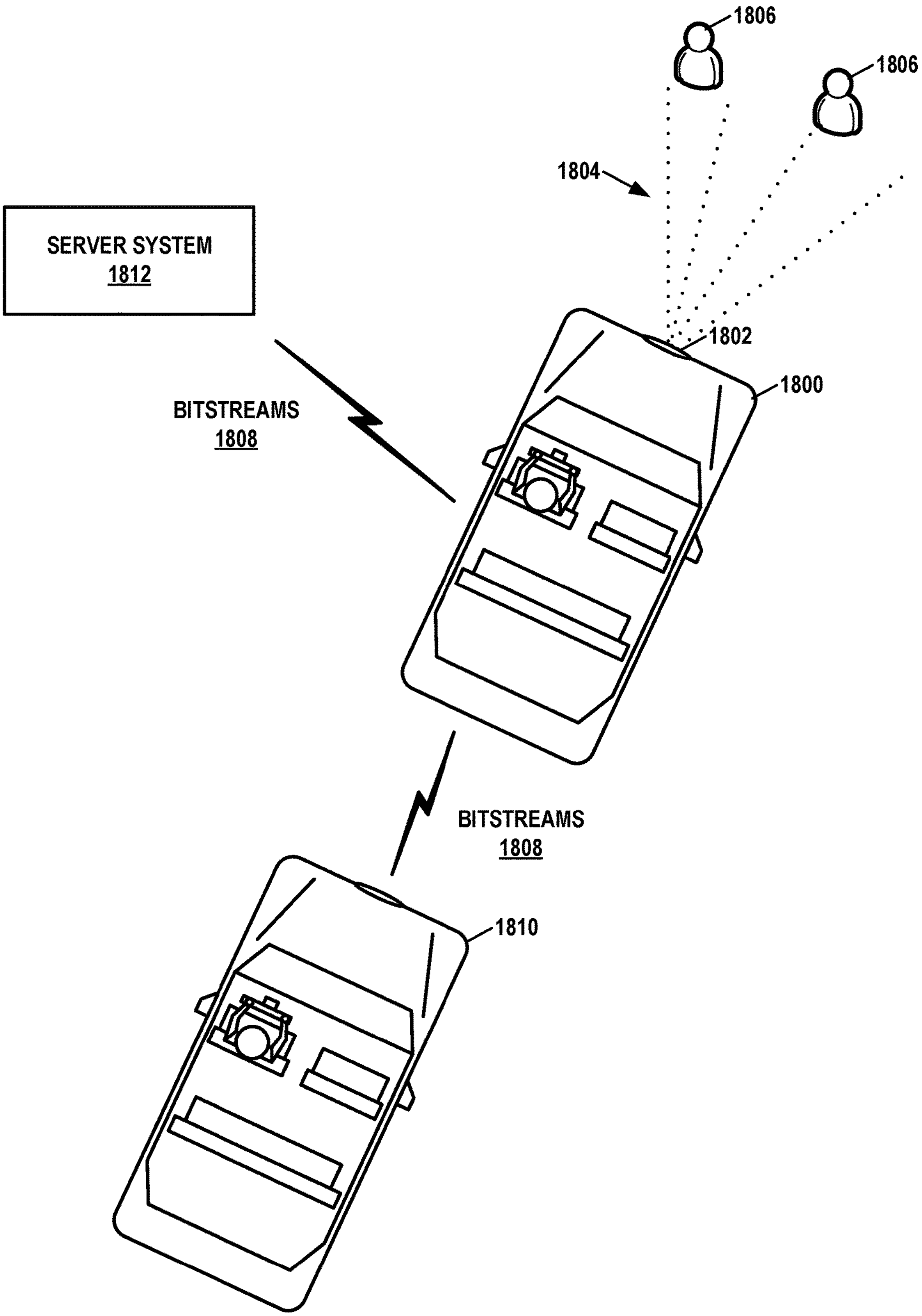
FIG. 24 is a conceptual diagram illustrating an example vehicle-based scenario in which one or more techniques of this disclosure may be used.

FIG. 24 is a conceptual diagram illustrating an example vehicle-based scenario in which one or more techniques of this disclosure for coding point cloud data using predictive geometry coding and a vertical predictor may be used. In the example of FIG. 24, a vehicle 1800 includes a range-finding system 1802. Range-finding system 1802 may be implemented in the manner discussed with respect to FIG. 23. Although not shown in the example of FIG. 24, vehicle 1800 may also include a data source, such as data source 104 (FIG. 1), and a G-PCC encoder, such as G-PCC encoder 200

(FIG. 1). In the example of FIG. 24, range-finding system 1802 emits laser beams 1804 that reflect off pedestrians 1806 or other objects in a roadway. The data source of vehicle 1800 may generate a point cloud based on signals generated by range-finding system 1802. The G-PCC encoder of vehicle 1800 may encode the point cloud to generate bitstreams 1808, such as geometry bitstream (FIG. 2) and attribute bitstream (FIG. 2). Inter prediction and residual prediction, as described in this disclosure may reduce the size of the geometry bitstream. Bitstreams 1808 may include many fewer bits than the unencoded point cloud obtained by the G-PCC encoder.

An output interface of vehicle 1800 (e.g., output interface 108 (FIG. 1) may transmit bitstreams 1808 to one or more other devices. Bitstreams 1808 may include many fewer bits than the unencoded point cloud obtained by the G-PCC encoder. Thus, vehicle 1800 may be able to transmit bitstreams 1808 to other devices more quickly than the unencoded point cloud data. Additionally, bitstreams 1808 may require less data storage capacity on a device.

In the example of FIG. 24, vehicle 1800 may transmit bitstreams 1808 to another vehicle 1810. Vehicle 1810 may include a G-PCC decoder, such as G-PCC decoder 300 (FIG. 1). The G-PCC decoder of vehicle 1810 may decode bitstreams 1808 to reconstruct the point cloud. Vehicle 1810 may use the reconstructed point cloud for various purposes. For instance, vehicle 1810 may determine based on the reconstructed point cloud that pedestrians 1806 are in the roadway ahead of vehicle 1800 and therefore start slowing down, e.g., even before a driver of vehicle 1810 realizes that pedestrians 1806 are in the roadway. Thus, in some examples, vehicle 1810 may perform an autonomous navigation operation based on the reconstructed point cloud.

Additionally or alternatively, vehicle 1800 may transmit bitstreams 1808 to a server system 1812. Server system 1812 may use bitstreams 1808 for various purposes. For example, server system 1812 may store bitstreams 1808 for subsequent reconstruction of the point clouds. In this example, server system 1812 may use the point clouds along with other data (e.g., vehicle telemetry data generated by vehicle 1800) to train an autonomous driving system. In other example, server system 1812 may store bitstreams 1808 for subsequent reconstruction for forensic crash investigations.

Figure 25:
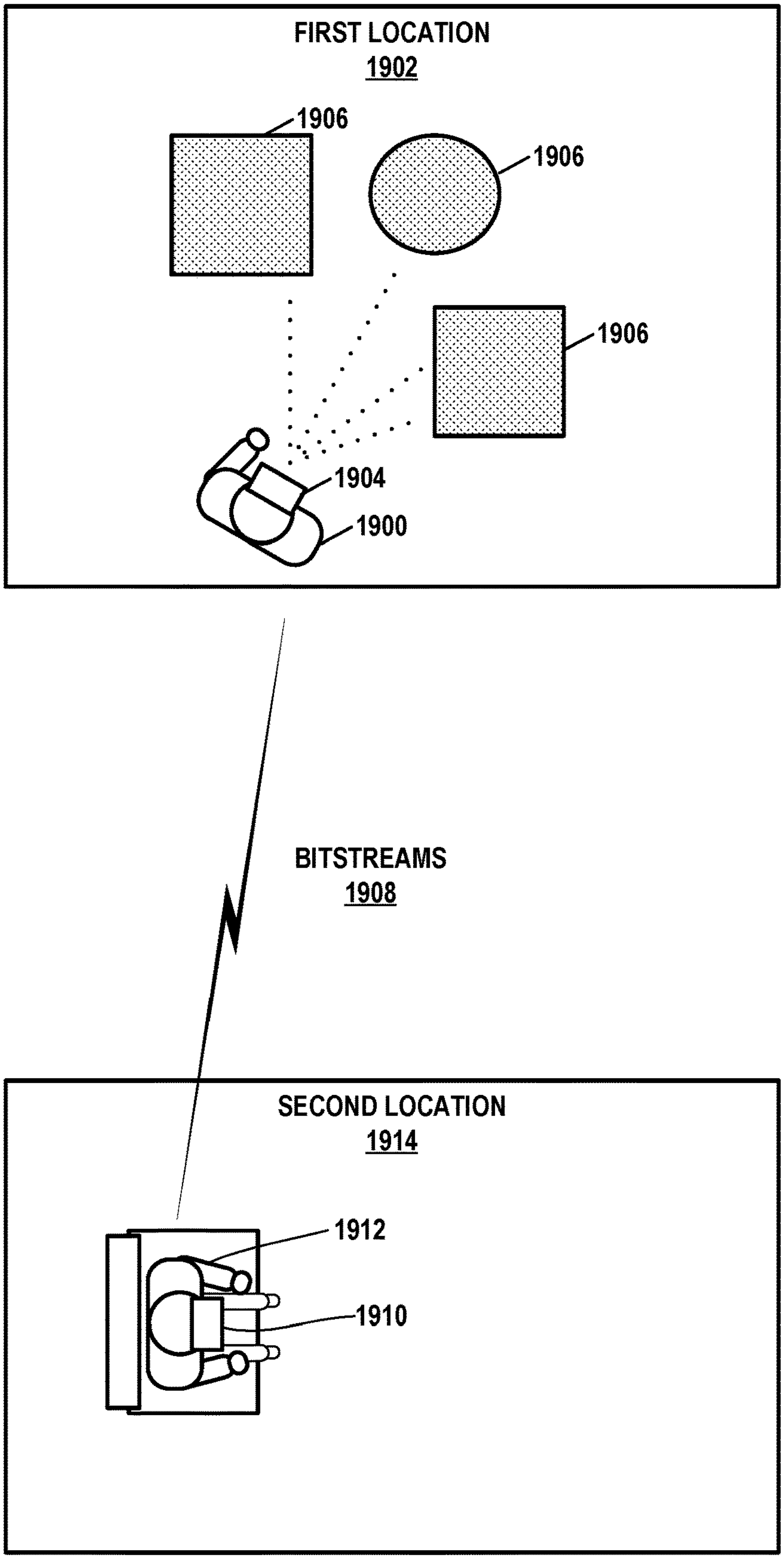
FIG. 25 is a conceptual diagram illustrating an example extended reality system in which one or more techniques of this disclosure may be used.

FIG. 25 is a conceptual diagram illustrating an example extended reality system in which one or more techniques of this disclosure for coding point cloud data using predictive geometry coding and a vertical predictor may be used. Extended reality (XR) is a term used to cover a range of technologies that includes augmented reality (AR), mixed reality (MR), and virtual reality (VR). In the example of FIG. 25, a user 1900 is located in a first location 1902. User 1900 wears an XR headset 1904. As an alternative to XR headset 1904, user 1900 may use a mobile device (e.g., mobile phone, tablet computer, etc.). XR headset 1904 includes a depth detection sensor, such as a range-finding system, that detects positions of points on objects 1906 at location 1902. A data source of XR headset 1904 may use the signals generated by the depth detection sensor to generate a point cloud representation of objects 1906 at location 1902. XR headset 1904 may include a G-PCC encoder (e.g., G-PCC encoder 200 of FIG. 1) that is configured to encode the point cloud to generate bitstreams 1908. Inter prediction and residual prediction, as described in this disclosure may reduce the size of bitstream 1908.

XR headset 1904 may transmit bitstreams 1908 (e.g., via a network such as the Internet) to an XR headset 1910 worn by a user 1912 at a second location 1914. XR headset 1910 may decode bitstreams 1908 to reconstruct the point cloud. XR headset 1910 may use the point cloud to generate an XR visualization (e.g., an AR, MR, VR visualization) representing objects 1906 at location 1902. Thus, in some examples, such as when XR headset 1910 generates an VR visualization, user 1912 may have a 3D immersive experience of location 1902. In some examples, XR headset 1910 may determine a position of a virtual object based on the reconstructed point cloud. For instance, XR headset 1910 may determine, based on the reconstructed point cloud, that an environment (e.g., location 1902) includes a flat surface and then determine that a virtual object (e.g., a cartoon character) is to be positioned on the flat surface. XR headset 1910 may generate an XR visualization in which the virtual object is at the determined position. For instance, XR headset 1910 may show the cartoon character sitting on the flat surface.

Figure 26:
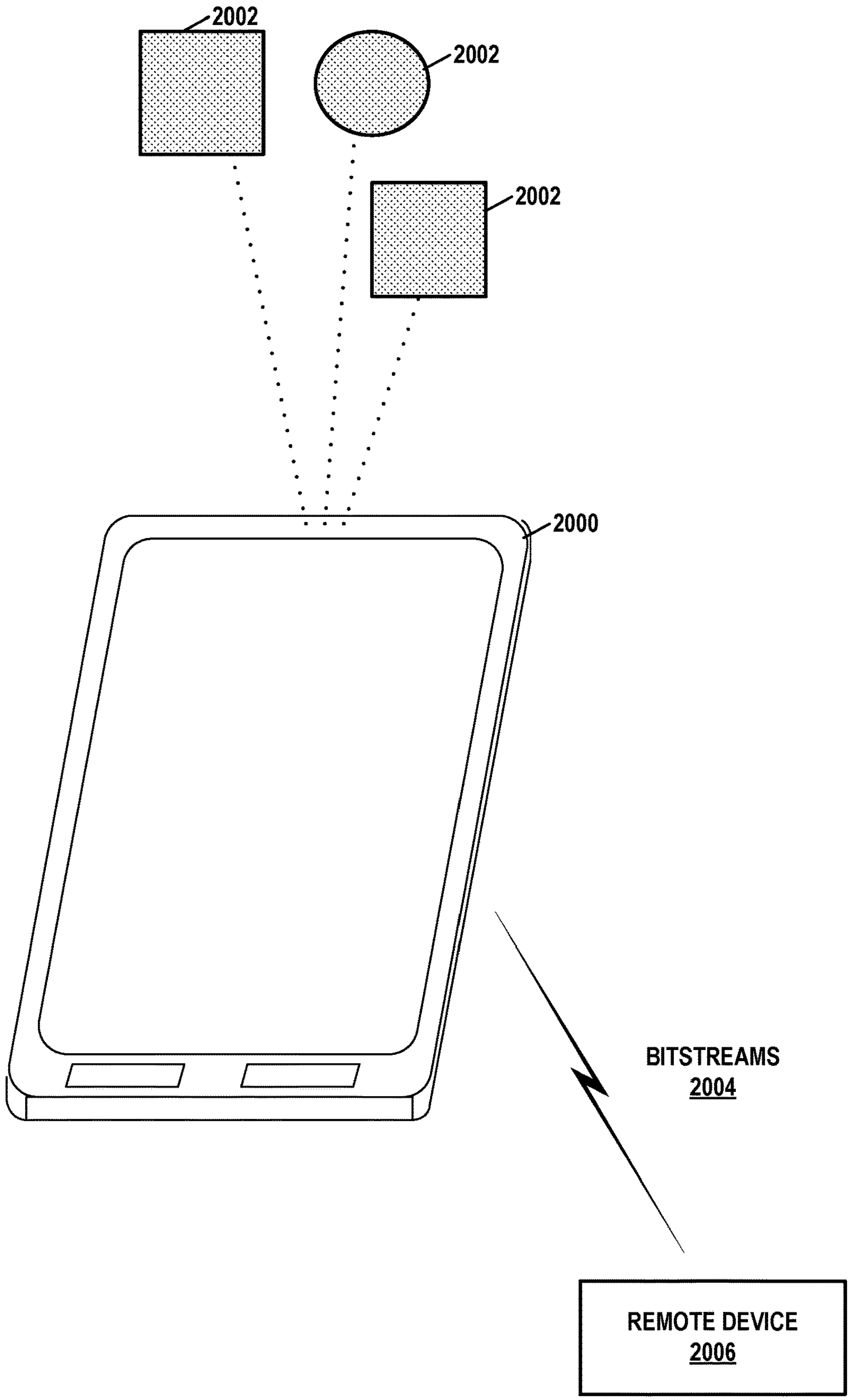
FIG. 26 is a conceptual diagram illustrating an example mobile device system in which one or more techniques of this disclosure may be used.

FIG. 26 is a conceptual diagram illustrating an example mobile device system in which one or more techniques of this disclosure for coding point cloud data using predictive geometry coding and a vertical predictor may be used. In the example of FIG. 26, a mobile device 2000 (e.g., a wireless communication device), such as a mobile phone or tablet computer, includes a range-finding system, such as a LIDAR system, that detects positions of points on objects 2002 in an environment of mobile device 2000. A data source of mobile device 2000 may use the signals generated by the depth detection sensor to generate a point cloud representation of objects 2002. Mobile device 2000 may include a G-PCC encoder (e.g., G-PCC encoder 200 of FIG. 1) that is configured to encode the point cloud to generate bitstreams 2004. In the example of FIG. 26, mobile device 2000 may transmit bitstreams to a remote device 2006, such as a server system or other mobile device. Inter prediction and residual prediction, as described in this disclosure may reduce the size of bitstreams 2004. Remote device 2006 may decode bitstreams 2004 to reconstruct the point cloud. Remote device 2006 may use the point cloud for various purposes. For example, remote device 2006 may use the point cloud to generate a map of environment of mobile device 2000. For instance, remote device 2006 may generate a map of an interior of a building based on the reconstructed point cloud. In another example, remote device 2006 may generate imagery (e.g., computer graphics) based on the point cloud. For instance, remote device 2006 may use points of the point cloud as vertices of polygons and use color attributes of the points as the basis for shading the polygons. In some examples, remote device 2006 may use the reconstructed point cloud for facial recognition or other security applications.

Examples in the various aspects of this disclosure may be used individually or in any combination.

This disclosure includes the following non-limiting clauses.

Clause 1A. A method of processing point cloud data, the method comprising: determining a first laser ID of a first point of the point cloud data, the first point comprising a current point or a previously coded point; determining a predictor laser ID list based on the first laser ID of the first point; and determining whether any laser IDs in the predictor laser ID list are outside a laser ID range of 0 to Lmax−1, where Lmax is a maximum number of lasers in a LIDAR system; removing any laser IDs in the predictor laser ID list that are outside the laser ID range; and processing the point cloud data based on the predictor laser ID list.

Clause 2A. The method of clause 1A, further comprising: determining that a number of entries in the predictor laser ID list is greater than a maximum number of entries in the predictor laser ID list; and based on the determination that the number of entries in the predictor laser ID list is greater than the maximum number of entries in the predictor laser ID list, removing one or more entries at an end of the predictor laser ID list until the number of entries in the predictor laser ID list is not greater than the maximum number of entries in the predictor laser ID list.

Clause 3A. The method of clause 1A or clause 2A, further comprising, for each laser ID in the predictor laser ID list, deriving a respective vertical predictor.

Clause 4A. The method of clause 3A, wherein deriving the respective vertical predictor comprises, for the first point having the first laser ID: determining a pivot azimuth value, the pivot azimuth value comprising the azimuth to the current point, an estimate of the azimuth to the current point, an azimuth to a previously coded point, or an estimate of the azimuth to the previously coded point; determining a first pivot azimuth index by scaling the pivot azimuth value; determining a second azimuth index based on a value of the first pivot azimuth index; determining a predictor azimuth index based on a value of the second azimuth index; and determining a vertical predictor to be a previously coded point that has the first laser ID and an azimuth index equal to the predictor azimuth index.

Clause 5A. The method of clause 4A, wherein the pivot azimuth value corresponds to the azimuth of the current point and wherein determining the predictor azimuth index based on the value of the second pivot azimuth index comprises setting the predictor azimuth index to equal the value of the second azimuth index.

Clause 6A. The method of clause 4A, wherein the pivot azimuth value corresponds to the azimuth of the current point and wherein determining the predictor azimuth index based on the value of the second pivot azimuth index comprises setting the predictor azimuth index to equal a smallest azimuth index value that is greater than or equal to the value of the second azimuth index.

Clause 7A. The method of clause 4A, wherein the pivot azimuth value corresponds to the azimuth of the previously coded point, and wherein determining the predictor azimuth index based on the value of the second pivot azimuth index comprises setting the predictor azimuth index to equal an index value that is greater than the value of the second azimuth index.

Clause 8A. The method of clause 4A, wherein the pivot azimuth value corresponds to the azimuth of the previously coded point, and wherein determining the predictor azimuth index based on the value of the second pivot azimuth index comprises setting the predictor azimuth index to equal to a smallest index value that is greater than the value of the second azimuth index and for which there is a point that is associated with the first laser ID and the smallest index value that is greater than the value of the second azimuth index.

Clause 9A. The method of clause 4A, wherein the pivot azimuth value corresponds to the azimuth of the previously coded point, and wherein determining the predictor azimuth index based on the value of the second pivot azimuth index comprises setting the predictor azimuth index to equal to a second smallest index value that is greater than the value of the second azimuth index and for which there is a point that is associated with the first laser ID and the second smallest index value that is greater than the value of the second azimuth index.

Clause 10A. The method of clause 4A, wherein the pivot azimuth value corresponds to the azimuth of the previously coded point, and wherein determining the predictor azimuth index based on the value of the second pivot azimuth index comprises setting the predictor azimuth index to equal to a largest index value that is smaller than the value of the second azimuth index and for which there is a point that is associated with the first laser ID and the largest index value that is smaller than the value of the second azimuth index.

Clause 11A. The method of clause 3A, wherein deriving the respective vertical predictor comprises, for the first point having the first laser ID: determining a plurality of predictor azimuth index values; and determining a vertical predictor based on weighted averaging or applying linear interpolation to a plurality of previously coded points.

Clause 12A. The method of any of clauses 1A-11A, further comprising generating the point cloud Clause 13A. A device for processing a point cloud, the device comprising one or more means for performing the method of any of clauses 1A-12A.

Clause 14A. The device of clause 13A, wherein the one or more means comprise one or more processors implemented in circuitry.

Clause 15A. The device of any of clauses 13A or 14A, further comprising a memory to store the data representing the point cloud.

Clause 16A. The device of any of clauses 13A-15A, wherein the device comprises a decoder.

Clause 17A. The device of any of clauses 13A-16A, wherein the device comprises an encoder.

Clause 18A. The device of any of clauses 13A-17A, further comprising a device to generate the point cloud.

Clause 19A. The device of any of clauses 13A-18A, further comprising a display to present imagery based on the point cloud.

Clause 20A. A computer-readable storage medium having stored thereon instructions that, when executed, cause one or more processors to perform the method of any of clauses 1A-12A.

Clause 1B. An apparatus configured to decode point cloud data, the apparatus comprising: a memory; and one or more processors coupled to the memory, the one or more processors configured to cause the apparatus to: determine a pivot laser ID; determine a vertical predictor for a current point of the point cloud data, wherein the vertical predictor is based on a second point having a second laser ID different than the pivot laser ID; and decode the current point using the vertical predictor and predictive geometry decoding.

Clause 2B. The apparatus of Clause 1B, wherein to determine the pivot laser ID, the one or more processors are further configured to cause the apparatus to: determine the pivot laser ID to be a laser ID of a previously decoded point.

Clause 3B. The apparatus of Clause 1B, wherein to determine the pivot laser ID, the one or more processors are further configured to cause the apparatus to: determine the pivot laser ID to be a laser ID of the current point.

Clause 4B. The apparatus of Clause 1B, wherein the one or more processors are further configured to cause the apparatus to: determine a predictor laser ID list based on the pivot laser ID, wherein the predictor laser ID list includes a plurality of laser IDs, including the second laser ID.

Clause 5B. The apparatus of Clause 4B, wherein the predictor laser ID list includes at least one laser ID above the pivot laser ID and at least one laser ID below the pivot laser ID.

Clause 6B. The apparatus of Clause 5B, wherein to determine the vertical predictor, the one or more processors are further configured to cause the apparatus to: determine a respective vertical predictor for each of the plurality of laser IDs in the predictor laser ID list; determine the vertical predictor to be a first respective vertical predictor associated with the laser ID directly above the pivot laser ID; or determine, based on the first respective vertical predictor being unavailable, the vertical predictor to be a second respective vertical predictor associated with the laser ID directly below the pivot laser ID; or determine, based on the first respective vertical predictor being unavailable and the second respective vertical predictor being unavailable, that no vertical predictor is available.

Clause 7B. The apparatus of Clause 4B, wherein to determine the predictor laser ID list, the one or more processors are further configured to cause the apparatus to:

determine whether any laser IDs in the predictor laser ID list are outside a laser ID range; and remove any laser IDs from the predictor laser ID list that are outside the laser ID range.

Clause 8B. The apparatus of any of Clauses 1B-7B, wherein to determine the vertical predictor for the current point, the one or more processors are further configured to cause the apparatus to: determine a pivot azimuth value; scale the pivot azimuth value to obtain a first pivot azimuth index; determine a second azimuth index based on the first pivot azimuth index; determine a predictor azimuth index based on the second azimuth index; and determine the vertical predictor based on the predictor azimuth index.

Clause 9B. The apparatus of Clause 8B, wherein to determine the pivot azimuth value, the one or more processors are further configured to cause the apparatus to: determine the pivot azimuth value from one of an azimuth of a previously decoded point, an azimuth of the current point, an estimate of an azimuth of the previously decoded point, or an estimate of an azimuth of the current point.

Clause 10B. The apparatus of Clause 8B, wherein to scale the pivot azimuth value, the one or more processors are further configured to cause the apparatus to: receive a vertical predictor azimuth scale value; and scale the pivot azimuth value using the vertical predictor azimuth scale value to obtain the first pivot azimuth index.

Clause 11B. The apparatus of Clause 8B, wherein to determine the vertical predictor based on the predictor azimuth index, the one or more processors are further configured to cause the apparatus to: determine the vertical predictor to be a previously coded point that has the second laser ID and an azimuth index equal to the predictor azimuth index.

Clause 12B. The apparatus of Clause 8B, wherein the pivot azimuth value corresponds to an azimuth of a previously coded point, and wherein to determine the predictor azimuth index based on the second azimuth index, the one or more processors are further configured to cause the apparatus to: set the predictor azimuth index to equal to a smallest index value that is greater than a value of the second azimuth index for which there is a point that is associated with the second laser ID.

Clause 13B. The apparatus of any of Clauses 1B-12B, wherein to decode the current point using the vertical predictor and predictive geometry decoding, the one or more processors are further configured to cause the apparatus to: decode residual coordinate values for the current point, wherein the residual coordinate values are in a spherical domain and include a residual radius; determine coordinate values of the vertical predictor, wherein the coordinate values of the vertical predictor are in the spherical domain and include a vertical predictor radius; and add the coordinate values of the vertical predictor to the residual coordinate values in order to obtained a reconstructed current point, wherein to add the coordinate values of the vertical predictor to the residual coordinate values, the one or more processors are further configured to cause the apparatus to add the residual radius to the vertical predictor radius.

Clause 14B. The apparatus of Clause 13B, wherein the one or more processors are further configured to cause the apparatus to: convert the reconstructed current point from the spherical domain to a Cartesian domain.

Clause 15B. The apparatus of Clause 13B, further comprising a display configured to present imagery based on the reconstructed current point.

Clause 16B. An apparatus configured to encode point cloud data, the apparatus comprising: a memory; and one or more processors coupled to the memory, the one or more processors configured to cause the apparatus to: determine a pivot laser ID; determine a vertical predictor for a current point of the point cloud data, wherein the vertical predictor is based on a second point having a second laser ID different than the pivot laser ID; and encode the current point using the vertical predictor and predictive geometry encoding.

Clause 17B. The apparatus of Clause 16B, wherein to determine the pivot laser ID, the one or more processors are further configured to cause the apparatus to: determine the pivot laser ID to be a laser ID of a previously encoded point.

Clause 18B. The apparatus of Clause 16B, wherein to determine the pivot laser ID, the one or more processors are further configured to cause the apparatus to: determine the pivot laser ID to be a laser ID of the current point.

Clause 19B. The apparatus of Clause 16B, wherein the one or more processors are further configured to cause the apparatus to: determine a predictor laser ID list based on the pivot laser ID, wherein the predictor laser ID list includes a plurality of laser IDs, including the second laser ID.

Clause 20B. The apparatus of Clause 19B, wherein the predictor laser ID list includes at least one laser ID above the pivot laser ID and at least one laser ID below the pivot laser ID.

Clause 21B. The apparatus of Clause 20B, wherein to determine the vertical predictor, the one or more processors are further configured to cause the apparatus to: determine a respective vertical predictor for each of the plurality of laser IDs in the predictor laser ID list; determine the vertical predictor to be a first respective vertical predictor associated with the laser ID directly above the pivot laser ID; or determine, based on the first respective vertical predictor being unavailable, the vertical predictor to be a second respective vertical predictor associated with the laser ID directly below the pivot laser ID; or determine, based on the first respective vertical predictor being unavailable and the second respective vertical predictor being unavailable, that no vertical predictor is available.

Clause 22B. The apparatus of Clause 19B, wherein to determine the predictor laser ID list, the one or more processors are further configured to cause the apparatus to:

determine whether any laser IDs in the predictor laser ID list are outside a laser ID range; and remove any laser IDs from the predictor laser ID list that are outside the laser ID range.

Clause 23B. The apparatus of any of Clauses 16B-22B, wherein to determine the vertical predictor for the current point, the one or more processors are further configured to cause the apparatus to: determine a pivot azimuth value; scale the pivot azimuth value to obtain a first pivot azimuth index; determine a second azimuth index based on the first pivot azimuth index; determine a predictor azimuth index based on the second azimuth index; and determine the vertical predictor based on the predictor azimuth index.

Clause 24B. The apparatus of Clause 23B, wherein to determine the pivot azimuth value, the one or more processors are further configured to cause the apparatus to: determine the pivot azimuth value from one of an azimuth of a previously encoded point, an azimuth of the current point, an estimate of an azimuth of the previously encoded point, or an estimate of an azimuth of the current point.

Clause 25B. The apparatus of Clause 23B, wherein to scale the pivot azimuth value, the one or more processors are further configured to cause the apparatus to: scale the pivot azimuth value using an vertical predictor azimuth scale value to obtain the first pivot azimuth index; and encode a syntax element indicating the vertical predictor azimuth scale value.

Clause 26B. The apparatus of Clause 23B, wherein to determine the vertical predictor based on the predictor azimuth index, the one or more processors are further configured to cause the apparatus to: determine the vertical predictor to be a previously coded point that has the second laser ID and an azimuth index equal to the predictor azimuth index.

Clause 27B. The apparatus of Clause 23B, wherein the pivot azimuth value corresponds to an azimuth of a previously coded point, and wherein to determine the predictor azimuth index based on the second azimuth index, the one or more processors are further configured to cause the apparatus to: set the predictor azimuth index to equal to a smallest index value that is greater than a value of the second azimuth index for which there is a point that is associated with the second laser ID.

Clause 28B. The apparatus of any of Clauses 16B-27B, wherein to encode the current point using the vertical predictor and predictive geometry encoding, the one or more processors are further configured to cause the apparatus to: determine coordinate values of the current point, wherein the coordinate values of the current point are in a spherical domain and include a radius; determine coordinate values of the vertical predictor, wherein the coordinate values of the vertical predictor are in the spherical domain and include a vertical predictor radius; subtract the coordinate values of the vertical predictor from the coordinate values of the current point to obtain residual values for the current point, wherein to subtract the coordinate values of the vertical predictor from the coordinate values of the current point, the one or more processors are further configured to cause the apparatus to subtract the vertical predictor radius from the radius; and encode the residual values.

Clause 29B. The apparatus of Clause 28B, wherein the one or more processors are further configured to cause the apparatus to: convert the current point from a Cartesian domain to the spherical domain to obtain the coordinate values of the current point.

Clause 30B. The apparatus of Clause 16, further comprising a sensor configured to capture the point cloud data.

Clause 31B. A method for decoding point cloud data, the method comprising: determining a pivot laser ID; determining a vertical predictor for a current point of the point cloud data, wherein the vertical predictor is based on a second point having a second laser ID different than the pivot laser ID; and decoding the current point using the vertical predictor and predictive geometry decoding.

Clause 32B. The method of Clause 31B, wherein determining the pivot laser ID comprises: determining the pivot laser ID to be a laser ID of a previously decoded point.

Clause 33B. The method of Clause 31B, wherein determining the pivot laser ID comprises: determining the pivot laser ID to be a laser ID of the current point.

Clause 34B. The method of Clause 31B, further comprising: determining a predictor laser ID list based on the pivot laser ID, wherein the predictor laser ID list includes a plurality of laser IDs, including the second laser ID.

Clause 35B. The method of Clause 34B, wherein the predictor laser ID list includes at least one laser ID above the pivot laser ID and at least one laser ID below the pivot laser ID.

Clause 36B. The method of Clause 35B, wherein determining the vertical predictor comprises: determining a respective vertical predictor for each of the plurality of laser IDs in the predictor laser ID list; determining the vertical predictor to be a first respective vertical predictor associated with the laser ID directly above the pivot laser ID; or determining, based on the first respective vertical predictor being unavailable, the vertical predictor to be a second respective vertical predictor associated with the laser ID directly below the pivot laser ID; or determining, based on the first respective vertical predictor being unavailable and the second respective vertical predictor being unavailable, that no vertical predictor is available.

Clause 37B. The method of Clause 34B, wherein determining the predictor laser ID list comprises: determining whether any laser IDs in the predictor laser ID list are outside a laser ID range; and removing any laser IDs from the predictor laser ID list that are outside the laser ID range.

Clause 38B. The method of any of Clauses 31B-37B, wherein determining the vertical predictor for the current point comprises: determining a pivot azimuth value; scaling the pivot azimuth value to obtain a first pivot azimuth index; determining a second azimuth index based on the first pivot azimuth index; determining a predictor azimuth index based on the second azimuth index; and determining the vertical predictor based on the predictor azimuth index.

Clause 39B. The method of Clause 38B, wherein determining the pivot azimuth value comprises: determining the pivot azimuth value from one of an azimuth of a previously decoded point, an azimuth of the current point, an estimate of an azimuth of the previously decoded point, or an estimate of an azimuth of the current point.

Clause 40B. The method of Clause 38B, wherein scaling the pivot azimuth value comprises: receiving a vertical predictor azimuth scale value; and scaling the pivot azimuth value using the vertical predictor azimuth scale value to obtain the first pivot azimuth index.

Clause 41B. The method of Clause 38B, wherein determining the vertical predictor based on the predictor azimuth index comprises: determining the vertical predictor to be a previously coded point that has the second laser ID and an azimuth index equal to the predictor azimuth index.

Clause 42B. The method of Clause 38B, wherein the pivot azimuth value corresponds to an azimuth of a previously coded point, and wherein determining the predictor azimuth index based on the second azimuth index comprises: setting the predictor azimuth index to equal to a smallest index value that is greater than a value of the second azimuth index for which there is a point that is associated with the second laser ID.

Clause 43B. The method of any of Clauses 31B-42B, wherein decoding the current point using the vertical predictor and predictive geometry decoding comprise: decoding residual coordinate values for the current point, wherein the residual coordinate values are in a spherical domain and include a residual radius; determining coordinate values of the vertical predictor, wherein the coordinate values of the vertical predictor are in the spherical domain and include a vertical predictor radius; and adding the coordinate values of the vertical predictor to the residual coordinate values in order to obtained a reconstructed current point, including adding the residual radius to the vertical predictor radius.

Clause 44B. The method of Clause 43B, further comprising: converting the reconstructed current point from the spherical domain to a Cartesian domain.

Clause 45B. The method of Clause 43B, further comprising: displaying imagery based on the reconstructed current point.

Clause 46B. A method for encoding point cloud data, the method comprising: determining a pivot laser ID; determining a vertical predictor for a current point of the point cloud data, wherein the vertical predictor is based on a second point having a second laser ID different than the pivot laser ID; and encoding the current point using the vertical predictor and predictive geometry encoding.

Clause 47B. The method of Clause 46B, wherein determining the pivot laser ID comprises: determining the pivot laser ID to be a laser ID of a previously encoded point.

Clause 48B. The method of Clause 46B, wherein determining the pivot laser ID comprises: determining the pivot laser ID to be a laser ID of the current point.

Clause 49B. The method of Clause 46B, further comprising: determining a predictor laser ID list based on the pivot laser ID, wherein the predictor laser ID list includes a plurality of laser IDs, including the second laser ID.

Clause 50B. The method of Clause 49B, wherein the predictor laser ID list includes at least one laser ID above the pivot laser ID and at least one laser ID below the pivot laser ID.

Clause 51B. The method of Clause 50B, wherein determining the vertical predictor comprises: determining a respective vertical predictor for each of the plurality of laser IDs in the predictor laser ID list; determining the vertical predictor to be a first respective vertical predictor associated with the laser ID directly above the pivot laser ID; or determining, based on the first respective vertical predictor being unavailable, the vertical predictor to be a second respective vertical predictor associated with the laser ID directly below the pivot laser ID; or determining, based on the first respective vertical predictor being unavailable and the second respective vertical predictor being unavailable, that no vertical predictor is available.

Clause 52B. The method of Clause 49B, wherein determining the predictor laser ID list comprises: determining whether any laser IDs in the predictor laser ID list are outside a laser ID range; and removing any laser IDs from the predictor laser ID list that are outside the laser ID range.

Clause 53B. The method of any of Clauses 46B-52B, wherein determining the vertical predictor for the current point comprises: determining a pivot azimuth value; scaling the pivot azimuth value to obtain a first pivot azimuth index; determining a second azimuth index based on the first pivot azimuth index; determining a predictor azimuth index based on the second azimuth index; and determining the vertical predictor based on the predictor azimuth index.

Clause 54B. The method of Clause 53B, wherein determining the pivot azimuth value comprises: determining the pivot azimuth value from one of an azimuth of a previously encoded point, an azimuth of the current point, an estimate of an azimuth of the previously encoded point, or an estimate of an azimuth of the current point.

Clause 55B. The method of Clause 53B, wherein scaling the pivot azimuth value comprises: scaling the pivot azimuth value using an vertical predictor azimuth scale value to obtain the first pivot azimuth index; and encoding a syntax element indicating the vertical predictor azimuth scale value.

Clause 56B. The method of Clause 53B, wherein determining the vertical predictor based on the predictor azimuth index comprises: determining the vertical predictor to be a previously coded point that has the second laser ID and an azimuth index equal to the predictor azimuth index.

Clause 57B. The method of Clause 53B, wherein the pivot azimuth value corresponds to an azimuth of a previously coded point, and wherein determining the predictor azimuth index based on the second azimuth index comprises: setting the predictor azimuth index to equal to a smallest index value that is greater than a value of the second azimuth index for which there is a point that is associated with the second laser ID.

Clause 58B. The method of any of Clauses 46B-527B, wherein encoding the current point using the vertical predictor and predictive geometry encoding comprises: determining coordinate values of the current point, wherein the coordinate values of the current point are in a spherical domain and include a radius; determining coordinate values of the vertical predictor, wherein the coordinate values of the vertical predictor are in the spherical domain and include a vertical predictor radius; subtracting the coordinate values of the vertical predictor from the coordinate values of the current point to obtain residual values for the current point, including subtracting the vertical predictor radius from the radius; and encoding the residual values.

Clause 59B. The method of Clause 58B, further comprising: converting the current point from a Cartesian domain to the spherical domain to obtain the coordinate values of the current point.

Clause 60B. The method of Clause 46B, further comprising: capturing the point cloud data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode point cloud data, the apparatus comprising:

a memory; and one or more processors coupled to the memory, the one or more processors configured to cause the apparatus to:

determine a pivot laser ID for a current point of the point cloud data;

determine a vertical predictor for the current point of the point cloud data, wherein the vertical predictor is based on a second point having a second laser ID different than the pivot laser ID, wherein to determine the vertical predictor for the current point, the one or more processors are further configured to cause the apparatus to:

determine a pivot azimuth value;

scale the pivot azimuth value to obtain a first pivot azimuth index;

determine a second azimuth index based on the first pivot azimuth index;

determine a plurality of predictor azimuth indices based on the second azimuth index:

identify a plurality of previously decoded points having the second laser ID and respective azimuth indices equal to the plurality of predictor azimuth indices;

derive the vertical predictor by performing a weighted average of the plurality of previously decoded points; and perform predictive geometry decoding using the vertical predictor to decode a position of the current point.

2. The apparatus of claim 1, wherein to determine the pivot laser ID, the one or more processors are further configured to cause the apparatus to:

determine the pivot laser ID to be a laser ID of a previously decoded point decoded before the current point.

3. The apparatus of claim 1, wherein to determine the pivot laser ID, the one or more processors are further configured to cause the apparatus to:

determine the pivot laser ID to be a laser ID of the current point.

4. The apparatus of claim 1, wherein the one or more processors are further configured to cause the apparatus to:

determine a predictor laser ID list based on the pivot laser ID, wherein the predictor laser ID list includes a plurality of laser IDs, including the second laser ID.

5. The apparatus of claim 4, wherein the predictor laser ID list includes at least one laser ID above the pivot laser ID and at least one laser ID below the pivot laser ID.

6. The apparatus of claim 5, wherein to determine the vertical predictor, the one or more processors are further configured to cause the apparatus to:

determine a respective vertical predictor for each of the plurality of laser IDs in the predictor laser ID list;

determine the vertical predictor to be a first respective vertical predictor associated with the laser ID directly above the pivot laser ID; or determine, based on the first respective vertical predictor being unavailable, the vertical predictor to be a second respective vertical predictor associated with the laser ID directly below the pivot laser ID; or determine, based on the first respective vertical predictor being unavailable and the second respective vertical predictor being unavailable, that no vertical predictor is available.

7. The apparatus of claim 4, wherein to determine the predictor laser ID list, the one or more processors are further configured to cause the apparatus to:

determine whether any laser IDs in the predictor laser ID list are outside a laser ID range; and remove any laser IDs from the predictor laser ID list that are outside the laser ID range.

8. The apparatus of claim 1, wherein to determine the pivot azimuth value, the one or more processors are further configured to cause the apparatus to:

determine the pivot azimuth value from one of an azimuth of a previously decoded point, an azimuth of the current point, an estimate of an azimuth of the previously decoded point, or an estimate of an azimuth of the current point.

9. The apparatus of claim 1, wherein to scale the pivot azimuth value, the one or more processors are further configured to cause the apparatus to:

receive a vertical predictor azimuth scale value; and scale the pivot azimuth value using the vertical predictor azimuth scale value to obtain the first pivot azimuth index.

10. The apparatus of claim 1, wherein to decode the current point using the vertical predictor and predictive geometry decoding, the one or more processors are further configured to cause the apparatus to:

decode residual coordinate values for the current point, wherein the residual coordinate values are in a spherical domain and include a residual radius;

determine coordinate values of the vertical predictor, wherein the coordinate values of the vertical predictor are in the spherical domain and include a vertical predictor radius; and add the coordinate values of the vertical predictor to the residual coordinate values in order to obtained a reconstructed current point, wherein to add the coordinate values of the vertical predictor to the residual coordinate values, the one or more processors are further configured to cause the apparatus to add the residual radius to the vertical predictor radius.

11. The apparatus of claim 10, wherein the one or more processors are further configured to cause the apparatus to:

convert the reconstructed current point from the spherical domain to a Cartesian domain.

12. The apparatus of claim 10, further comprising a display configured to present imagery based on the reconstructed current point.

13. An apparatus configured to encode point cloud data, the apparatus comprising:

a memory; and one or more processors coupled to the memory, the one or more processors configured to cause the apparatus to:

determine a pivot laser ID for a current point of the point cloud data;

determine a vertical predictor for the current point of the point cloud data, wherein the vertical predictor is based on a second point having a second laser ID different than the pivot laser ID, wherein to determine the vertical predictor for the current point, the one or more processors are further configured to cause the apparatus to:

determine a pivot azimuth value;

scale the pivot azimuth value to obtain a first pivot azimuth index;

determine a second azimuth index based on the first pivot azimuth index;

determine a plurality of predictor azimuth indices based on the second azimuth index;

identify a plurality of previously decoded points having the second laser ID and respective azimuth indices equal to the plurality of predictor azimuth indices;

derive the vertical predictor by performing a weighted average of the plurality of previously decoded points; and perform predictive geometry encoding using the vertical predictor to encode a position of the current point.

14. The apparatus of claim 13, wherein to determine the pivot laser ID, the one or more processors are further configured to cause the apparatus to:

determine the pivot laser ID to be a laser ID of a previously encoded point encoded before the current point.

15. The apparatus of claim 13, wherein to determine the pivot laser ID, the one or more processors are further configured to cause the apparatus to:

determine the pivot laser ID to be a laser ID of the current point.

16. The apparatus of claim 13, wherein the one or more processors are further configured to cause the apparatus to:

determine a predictor laser ID list based on the pivot laser ID, wherein the predictor laser ID list includes a plurality of laser IDs, including the second laser ID.

17. The apparatus of claim 16, wherein the predictor laser ID list includes at least one laser ID above the pivot laser ID and at least one laser ID below the pivot laser ID.

18. The apparatus of claim 17, wherein to determine the vertical predictor, the one or more processors are further configured to cause the apparatus to:

determine a respective vertical predictor for each of the plurality of laser IDs in the predictor laser ID list;

determine the vertical predictor to be a first respective vertical predictor associated with the laser ID directly above the pivot laser ID; or determine, based on the first respective vertical predictor being unavailable, the vertical predictor to be a second respective vertical predictor associated with the laser ID directly below the pivot laser ID; or determine, based on the first respective vertical predictor being unavailable and the second respective vertical predictor being unavailable, that no vertical predictor is available.

19. The apparatus of claim 16, wherein to determine the predictor laser ID list, the one or more processors are further configured to cause the apparatus to:

determine whether any laser IDs in the predictor laser ID list are outside a laser ID range; and remove any laser IDs from the predictor laser ID list that are outside the laser ID range.

20. The apparatus of claim 13, wherein to determine the pivot azimuth value, the one or more processors are further configured to cause the apparatus to:

determine the pivot azimuth value from one of an azimuth of a previously encoded point, an azimuth of the current point, an estimate of an azimuth of the previously encoded point, or an estimate of an azimuth of the current point.

21. The apparatus of claim 13, wherein to scale the pivot azimuth value, the one or more processors are further configured to cause the apparatus to:

scale the pivot azimuth value using a vertical predictor azimuth scale value to obtain the first pivot azimuth index; and encode a syntax element indicating the vertical predictor azimuth scale value.

22. The apparatus of claim 13, wherein to encode the current point using the vertical predictor and predictive geometry encoding, the one or more processors are further configured to cause the apparatus to:

determine coordinate values of the current point, wherein the coordinate values of the current point are in a spherical domain and include a radius;

determine coordinate values of the vertical predictor, wherein the coordinate values of the vertical predictor are in the spherical domain and include a vertical predictor radius;

subtract the coordinate values of the vertical predictor from the coordinate values of the current point to obtain residual values for the current point, wherein to subtract the coordinate values of the vertical predictor from the coordinate values of the current point, the one or more processors are further configured to cause the apparatus to subtract the vertical predictor radius from the radius; and encode the residual values.

23. The apparatus of claim 22, wherein the one or more processors are further configured to cause the apparatus to:

convert the current point from a Cartesian domain to the spherical domain to obtain the coordinate values of the current point.

24. The apparatus of claim 13, further comprising a sensor configured to capture the point cloud data.

25. A method for decoding point cloud data, the method comprising:

determining a pivot laser ID for a current point of the point cloud data;

determining a vertical predictor for the current point of the point cloud data, wherein the vertical predictor is based on a second point having a second laser ID different than the pivot laser ID, wherein determining the vertical predictor for the current point comprises:

determining a pivot azimuth value;

scaling the pivot azimuth value to obtain a first pivot azimuth index;

determining a second azimuth index based on the first pivot azimuth index;

determining a plurality of predictor azimuth indices based on the second azimuth index;

identifying a plurality of previously decoded points having the second laser ID and respective azimuth indices equal to the plurality of predictor azimuth indices;

deriving the vertical predictor by performing a weighted average of the plurality of previously decoded points; and performing predictive geometry decoding using the vertical predictor to decode a position of the current point.

26. The method of claim 25, wherein determining the pivot laser ID comprises:

determining the pivot laser ID to be a laser ID of a previously decoded point decoded before the current point.

27. The method of claim 25, wherein determining the pivot laser ID comprises:

determining the pivot laser ID to be a laser ID of the current point.

28. The method of claim 25, further comprising:

determining a predictor laser ID list based on the pivot laser ID, wherein the predictor laser ID list includes a plurality of laser IDs, including the second laser ID.

29. The method of claim 28, wherein the predictor laser ID list includes at least one laser ID above the pivot laser ID and at least one laser ID below the pivot laser ID.

30. The method of claim 29, wherein determining the vertical predictor comprises:

determining a respective vertical predictor for each of the plurality of laser IDs in the predictor laser ID list;

determining the vertical predictor to be a first respective vertical predictor associated with the laser ID directly above the pivot laser ID; or determining, based on the first respective vertical predictor being unavailable, the vertical predictor to be a second respective vertical predictor associated with the laser ID directly below the pivot laser ID; or determining, based on the first respective vertical predictor being unavailable and the second respective vertical predictor being unavailable, that no vertical predictor is available.

31. The method of claim 28, wherein determining the predictor laser ID list comprises:

determining whether any laser IDs in the predictor laser ID list are outside a laser ID range; and removing any laser IDs from the predictor laser ID list that are outside the laser ID range.

32. The method of claim 31, wherein determining the pivot azimuth value comprises:

determining the pivot azimuth value from one of an azimuth of a previously decoded point, an azimuth of the current point, an estimate of an azimuth of the previously decoded point, or an estimate of an azimuth of the current point.

33. The method of claim 25, wherein scaling the pivot azimuth value comprises:

receiving a vertical predictor azimuth scale value; and scaling the pivot azimuth value using the vertical predictor azimuth scale value to obtain the first pivot azimuth index.

34. The method of claim 25, wherein decoding the current point using the vertical predictor and predictive geometry decoding comprise:

decoding residual coordinate values for the current point, wherein the residual coordinate values are in a spherical domain and include a residual radius;

determining coordinate values of the vertical predictor, wherein the coordinate values of the vertical predictor are in the spherical domain and include a vertical predictor radius; and adding the coordinate values of the vertical predictor to the residual coordinate values in order to obtained a reconstructed current point, including adding the residual radius to the vertical predictor radius.

35. The method of claim 34, further comprising:

converting the reconstructed current point from the spherical domain to a Cartesian domain.

36. The method of claim 34, further comprising:

displaying imagery based on the reconstructed current point.

37. A method for encoding point cloud data, the method comprising:

determining a pivot laser ID for a current point of the point cloud data;

determining a vertical predictor for the current point of the point cloud data, wherein the vertical predictor is based on a second point having a second laser ID different than the pivot laser ID, wherein determining the vertical predictor for the current point comprises:

determining a pivot azimuth value;

scaling the pivot azimuth value to obtain a first pivot azimuth index;

determining a second azimuth index based on the first pivot azimuth index;

determining a plurality of predictor azimuth indices based on the second azimuth index;

identifying a plurality of previously decoded points having the second laser ID and respective azimuth indices equal to the plurality of predictor azimuth indices;

deriving the vertical predictor by performing a weighted average of the plurality of previously decoded points; and performing predictive geometry encoding using the vertical predictor to encode a position of the current point.

38. The method of claim 37, wherein determining the pivot laser ID comprises:

determining the pivot laser ID to be a laser ID of a previously encoded point decoded before the current point.

39. The method of claim 37, wherein determining the pivot laser ID comprises:

determining the pivot laser ID to be a laser ID of the current point.

40. The method of claim 37, further comprising:

determining a predictor laser ID list based on the pivot laser ID, wherein the predictor laser ID list includes a plurality of laser IDs, including the second laser ID.

41. The method of claim 40, wherein the predictor laser ID list includes at least one laser ID above the pivot laser ID and at least one laser ID below the pivot laser ID.

42. The method of claim 41, wherein determining the vertical predictor comprises:

determining a respective vertical predictor for each of the plurality of laser IDs in the predictor laser ID list;

determining the vertical predictor to be a first respective vertical predictor associated with the laser ID directly above the pivot laser ID; or determining, based on the first respective vertical predictor being unavailable, the vertical predictor to be a second respective vertical predictor associated with the laser ID directly below the pivot laser ID; or determining, based on the first respective vertical predictor being unavailable and the second respective vertical predictor being unavailable, that no vertical predictor is available.

43. The method of claim 40, wherein determining the predictor laser ID list comprises:

determining whether any laser IDs in the predictor laser ID list are outside a laser ID range; and removing any laser IDs from the predictor laser ID list that are outside the laser ID range.

44. The method of claim 37, wherein determining the pivot azimuth value comprises:

determining the pivot azimuth value from one of an azimuth of a previously encoded point, an azimuth of the current point, an estimate of an azimuth of the previously encoded point, or an estimate of an azimuth of the current point.

45. The method of claim 37, wherein scaling the pivot azimuth value comprises:

scaling the pivot azimuth value using a vertical predictor azimuth scale value to obtain the first pivot azimuth index; and encoding a syntax element indicating the vertical predictor azimuth scale value.

46. The method of claim 37, wherein encoding the current point using the vertical predictor and predictive geometry encoding comprises:

determining coordinate values of the current point, wherein the coordinate values of the current point are in a spherical domain and include a radius;

determining coordinate values of the vertical predictor, wherein the coordinate values of the vertical predictor are in the spherical domain and include a vertical predictor radius;

subtracting the coordinate values of the vertical predictor from the coordinate values of the current point to obtain residual values for the current point, including subtracting the vertical predictor radius from the radius; and encoding the residual values.

47. The method of claim 46, further comprising:

converting the current point from a Cartesian domain to the spherical domain to obtain the coordinate values of the current point.

48. The method of claim 37, further comprising:

capturing the point cloud data.

49. The apparatus of claim 1, wherein to determine the vertical predictor, the one or more processors are further configured to generate a lookup table for a current frame of the point cloud data, wherein the lookup table is indexed by a 2-tuple comprising a laser ID and an azimuth index.

50. The apparatus of claim 1, wherein the pivot azimuth value is scaled using a first vertical predictor azimuth scale value associated with the pivot laser ID, and wherein the one or more processors are further configured to scale an azimuth value of a previously decoded point using a second vertical predictor azimuth scale value associated with the second laser ID that is different from the first vertical predictor azimuth scale value, wherein the first vertical predictor azimuth scale value and the second vertical predictor azimuth scale value are derived based on a respective sampling frequency associated with the pivot laser ID and the second laser ID.

51. The apparatus of claim 1, wherein to identify the plurality of previously decoded points, the one or more processors are further configured to cause the apparatus to:

identify each previously decoded point of the plurality of previously decoded points to be a previously decoded point that has the second laser ID and an azimuth index equal to a respective predictor azimuth index of the plurality of predictor azimuth indices.

52. The apparatus of claim 1, wherein the pivot azimuth value corresponds to an azimuth of a previously decoded point, and wherein to determine the plurality of predictor azimuth indices based on the second azimuth index, the one or more processors are further configured to cause the apparatus to:

set at least one predictor azimuth index of the plurality of predictor azimuth indices equal to a smallest index value that is greater than a value of the second azimuth index for which there is a point that is associated with the second laser ID.

53. The apparatus of claim 13, wherein to identify the plurality of previously decoded points, the one or more processors are further configured to cause the apparatus to:

identify each previously decoded point of the plurality of previously decoded points to be a previously decoded point that has the second laser ID and an azimuth index equal to a respective predictor azimuth index of the plurality of predictor azimuth indices.

54. The apparatus of claim 13, wherein the pivot azimuth value corresponds to an azimuth of a previously decoded point, and wherein to determine the plurality of predictor azimuth indices based on the second azimuth index, the one or more processors are further configured to cause the apparatus to:

set at least one predictor azimuth index of the plurality of predictor azimuth indices equal to a smallest index value that is greater than a value of the second azimuth index for which there is a point that is associated with the second laser ID.

55. The method of claim 25, wherein identifying the plurality of previously decoded points comprises:

identifying each previously decoded point of the plurality of previously decoded points to be a previously decoded point that has the second laser ID and an azimuth index equal to a respective predictor azimuth index of the plurality of predictor azimuth indices.

56. The method of claim 25, wherein the pivot azimuth value corresponds to an azimuth of a previously decoded point, and wherein determining the plurality of predictor azimuth indices based on the second azimuth index comprises:

setting at least one predictor azimuth index of the plurality of predictor azimuth indices equal to a smallest index value that is greater than a value of the second azimuth index for which there is a point that is associated with the second laser ID.

57. The method of claim 37, wherein identifying the plurality of previously decoded points comprises:

identifying each previously decoded point of the plurality of previously decoded points to be a previously decoded point that has the second laser ID and an azimuth index equal to a respective predictor azimuth index of the plurality of predictor azimuth indices.

58. The method of claim 37, wherein the pivot azimuth value corresponds to an azimuth of a previously decoded point, and wherein determining the plurality of predictor azimuth indices based on the second azimuth index comprises:

setting at least one predictor azimuth index of the plurality of predictor azimuth indices equal to a smallest index value that is greater than a value of the second azimuth index for which there is a point that is associated with the second laser ID.

59. An apparatus configured to decode point cloud data, the apparatus comprising:

a memory; and one or more processors coupled to the memory, the one or more processors configured to cause the apparatus to:

determine a pivot laser ID for a current point of the point cloud data;

determine a vertical predictor for the current point of the point cloud data, wherein the vertical predictor is based on a second point having a second laser ID different than the pivot laser ID, wherein to determine the vertical predictor for the current point, the one or more processors are further configured to:

determine a pivot azimuth value;

scale the pivot azimuth value to obtain a first pivot azimuth index;

determine a second azimuth index based on the first pivot azimuth index;

determine a plurality of predictor azimuth indices based on the second azimuth index;

identify a plurality of previously decoded points having the second laser ID and respective azimuth indices equal to the plurality of predictor azimuth indices;

derive the vertical predictor by performing a linear interpolation of the plurality of previously decoded points; and perform predictive geometry decoding using the vertical predictor to decode a position of the current point.

* * * * *